United States Patent [19]

Koshino et al.

[11] Patent Number: 5,771,213
[45] Date of Patent: Jun. 23, 1998

[54] DISC CHANGER

[75] Inventors: Katsuhiko Koshino, Neyagawa; Masanori Onishi, Hirakata, both of Japan

[73] Assignee: Matsushita Electric Industrial Co., Ltd., Kadoma, Japan

[21] Appl. No.: 665,527

[22] Filed: Jun. 18, 1996

Related U.S. Application Data

[63] Continuation of Ser. No. 179,603, Jan. 10, 1994, abandoned.

[30] Foreign Application Priority Data

Jan. 12, 1993 [JP] Japan ................................. 5-003112

[51] Int. Cl.⁶ .................................................. G11B 17/22
[52] U.S. Cl. ............................................. 369/37; 369/191
[58] Field of Search .............................. 369/37, 36, 75.2, 369/191, 192, 194, 38, 34, 178; 360/98.04, 98.06; 211/1.52, 1.53, 1.55, 163, 164

[56] References Cited

U.S. PATENT DOCUMENTS

| 4,670,866 | 6/1987 | Hasegawa et al. | 369/36 |
| 4,755,978 | 7/1988 | Takizawa et al. | 369/37 |
| 5,043,963 | 8/1991 | Iwamoto | 369/36 |
| 5,115,419 | 5/1992 | Akiyama et al. | 369/38 |
| 5,197,057 | 3/1993 | Iyama et al. | 369/37 |
| 5,270,989 | 12/1993 | Kimura | 369/37 |
| 5,422,869 | 6/1995 | Versleegers | 369/37 |

FOREIGN PATENT DOCUMENTS

| 62-192064 | 8/1987 | Japan . | |
| 62-239375 | 10/1987 | Japan . | |
| 2-68761 | 3/1990 | Japan | 369/258 |
| 3-292668 | 12/1991 | Japan | 369/37 |
| 4-23264 | 1/1992 | Japan | 369/37 |
| 5-28615 | 2/1993 | Japan . | |
| 5-182338 | 7/1993 | Japan . | |
| 6-60521 | 3/1994 | Japan . | |

*Primary Examiner*—Stuart S. Levy
*Assistant Examiner*—David L. Ometz
*Attorney, Agent, or Firm*—Renner, Otto, Boisselle & Sklar, P.L.L.

[57] ABSTRACT

A disc changer includes a tray support horizontally movable between a disc mounting position and a playing position in a housing; a rotation shaft on the tray support; and a tray rotatable around the rotation shaft and having a plurality of disc carrying areas each for carrying a disc, the disc carrying areas being equally angularly spaced. The tray has a generally polygonal profile, and the tray support has a width which is shorter than the effective diameter of the tray.

8 Claims, 23 Drawing Sheets

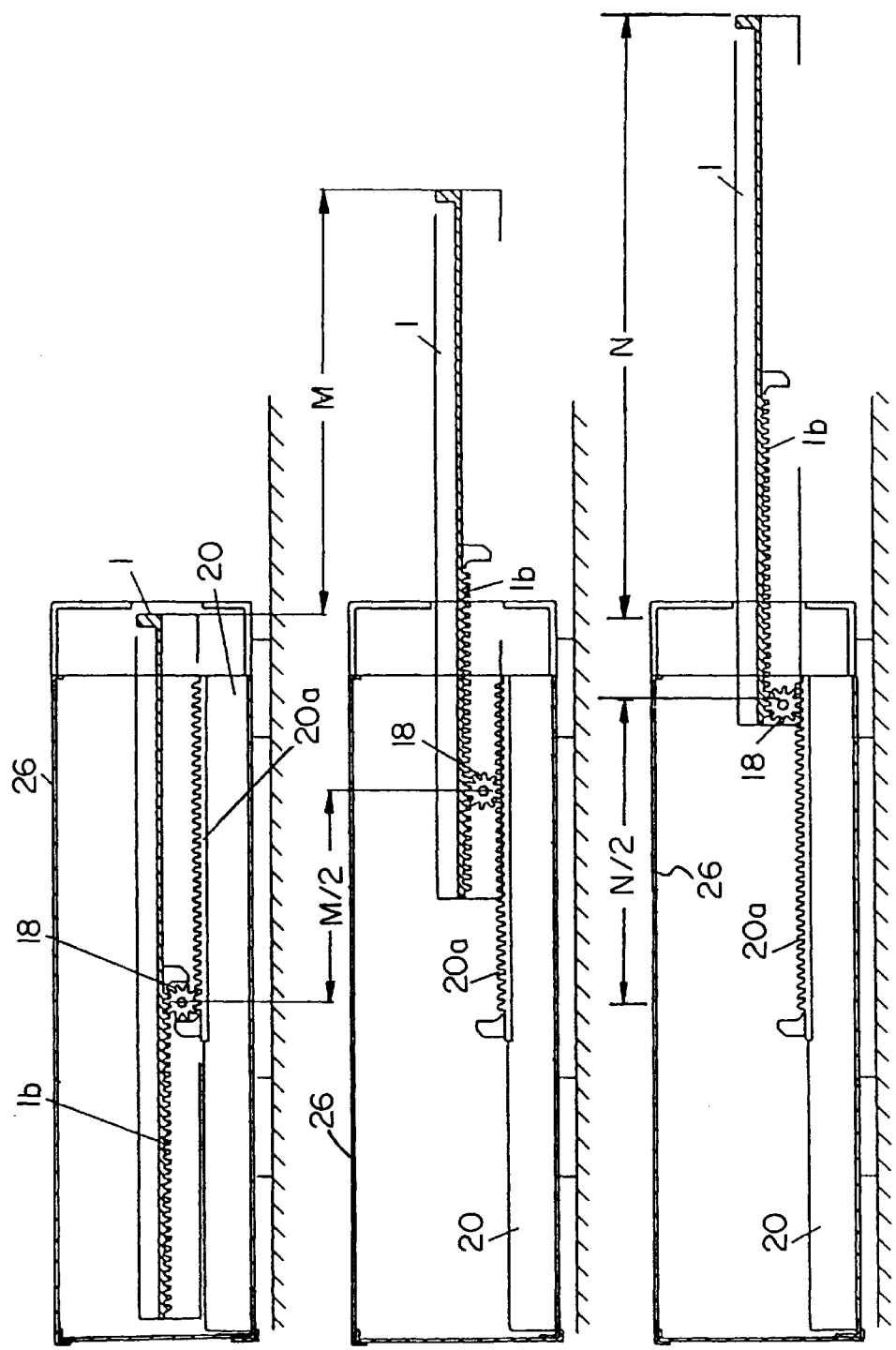

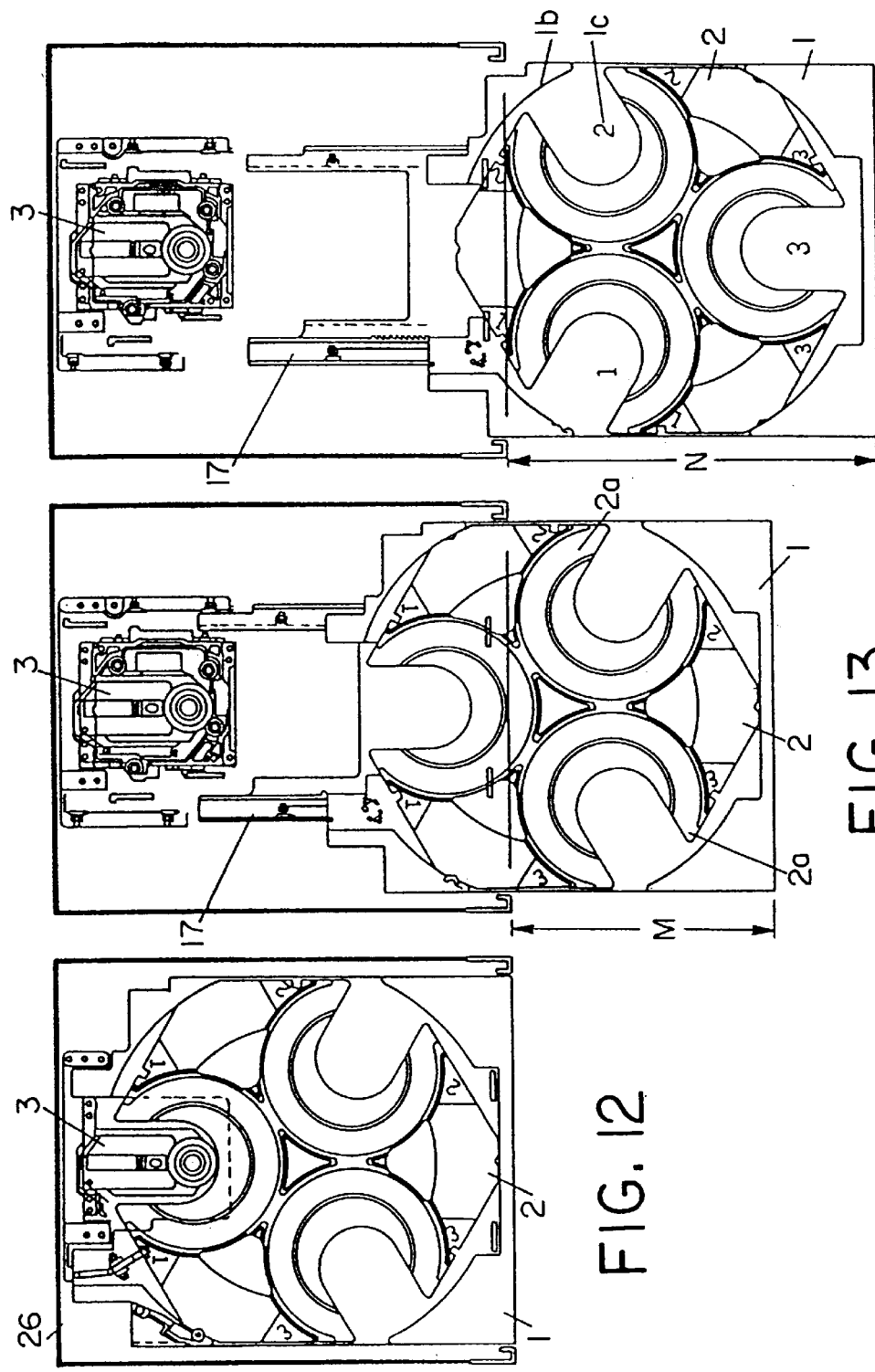

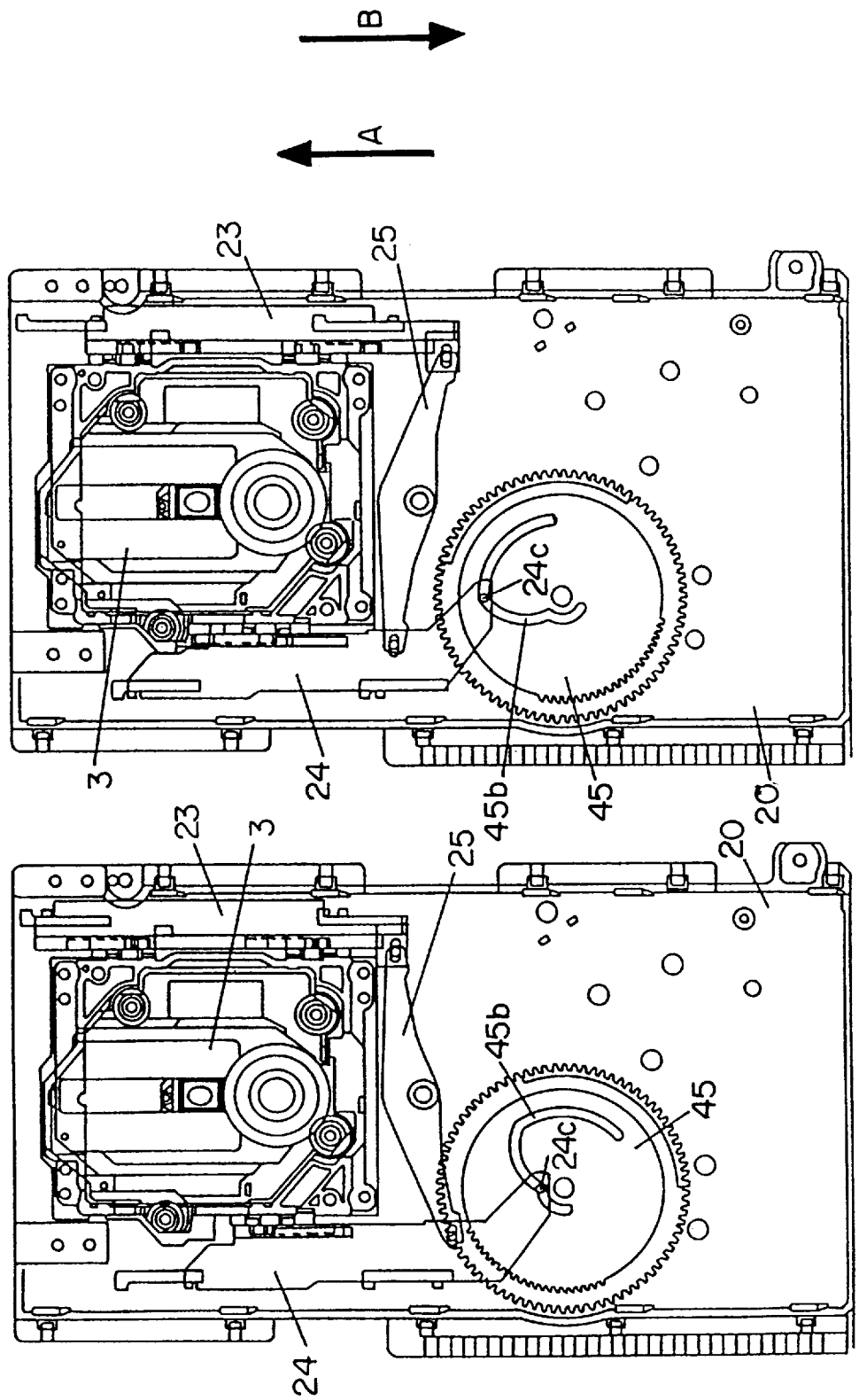

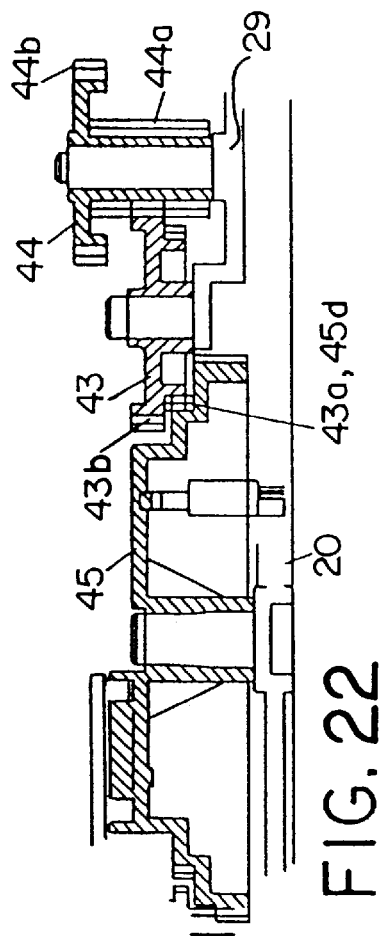
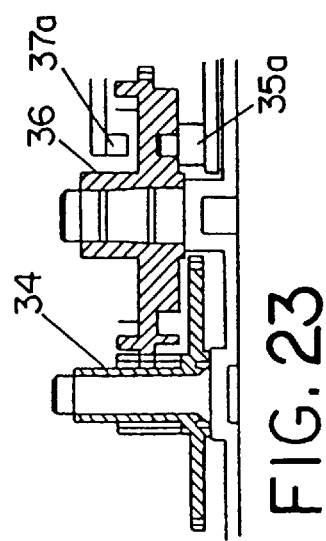
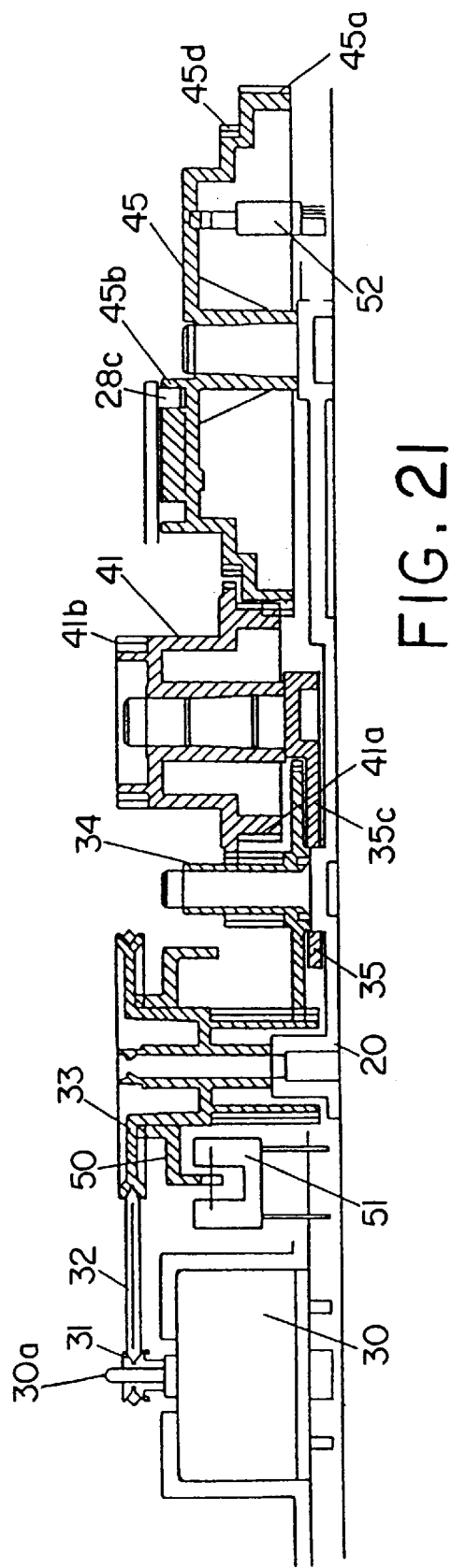
FIG. 22
FIG. 23
FIG. 21

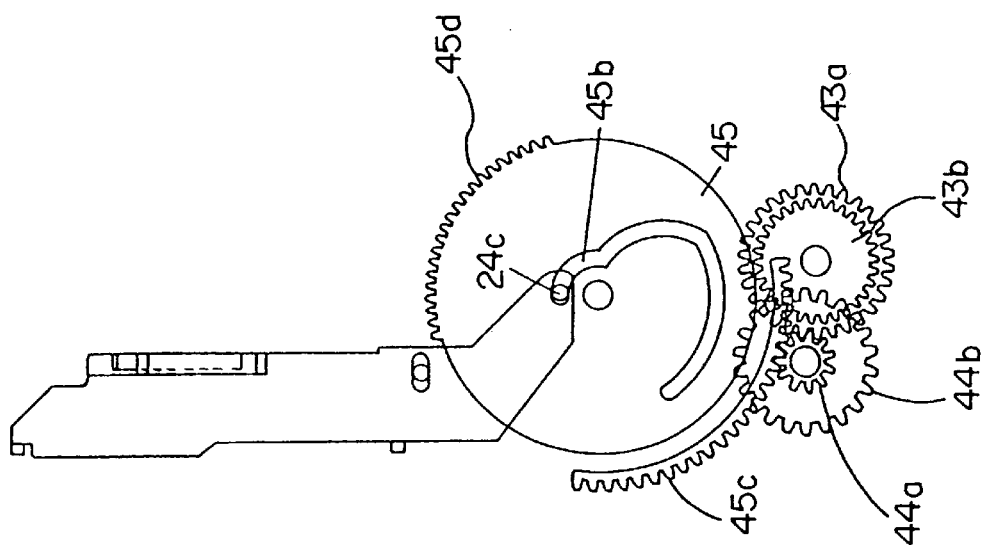
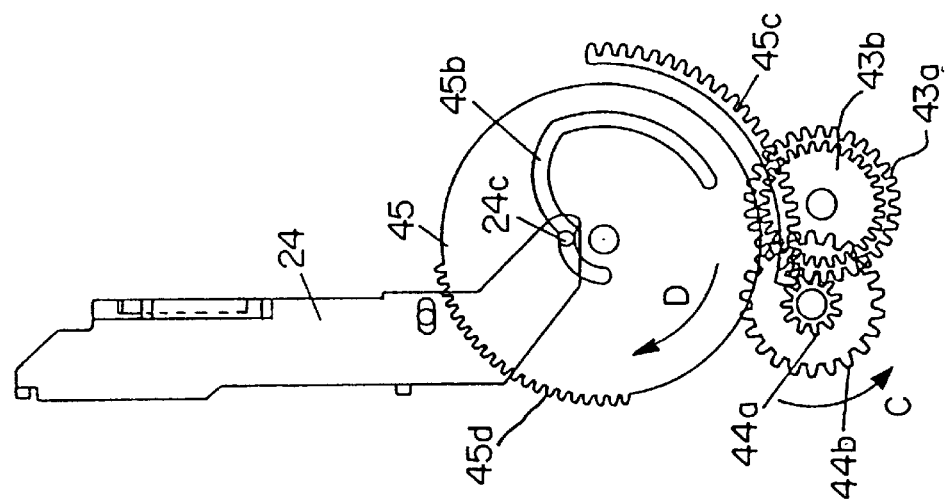
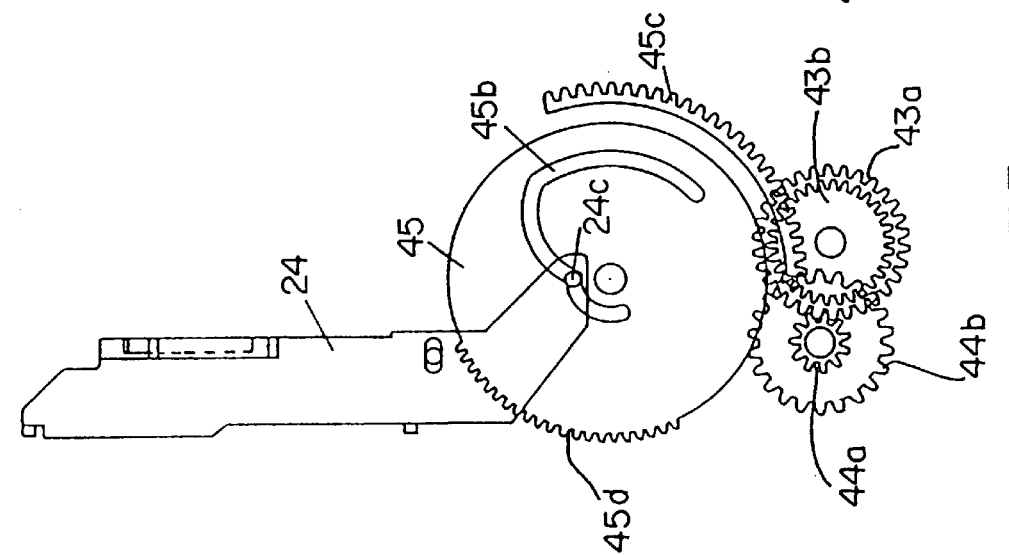

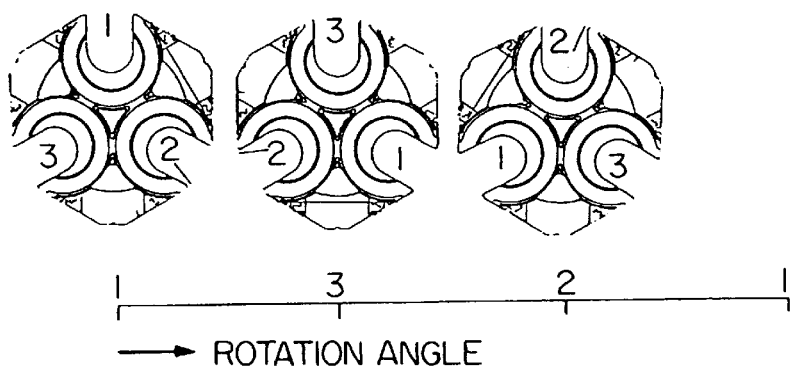
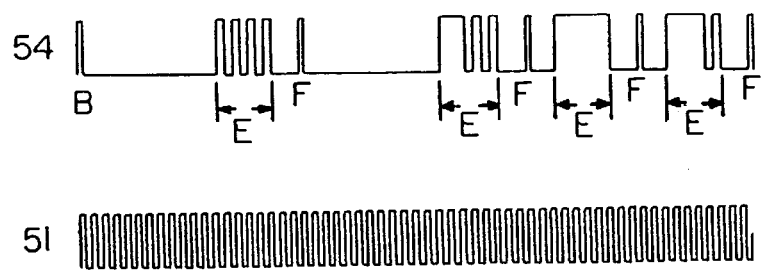
FIG. 44
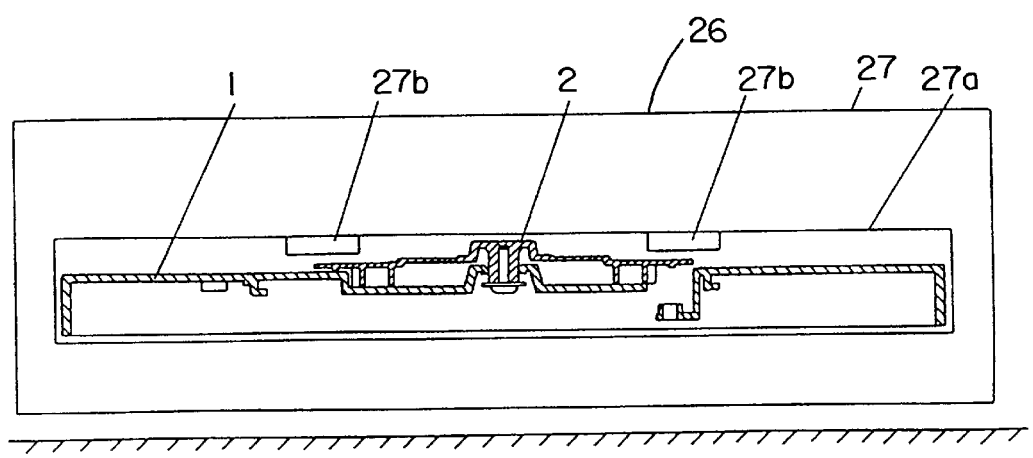
FIG. 45

DISC CHANGER

This application is a continuation of application Ser. No. 08/179,603, filed on Jan. 10, 1994, now abandoned.

BACKGROUND OF THE INVENTION

1. Field of the Invention

The present invention relates to a disc changer for changing a plurality of discs which can be placed on a rotatable tray.

2. Description of the Related Art

Recently, use of compact discs has spread, and thus disc changers have been in great demand. Rotation-system disc changers in which a disc carrying table is rotated to exchange the discs have been more and more popular because of the simple structure and easy operation. Today, most disc changers of this system have five disc carrying areas and thus have a large size.

With reference to FIGS. 46 to 48, a conventional rotation-system disc changer 200 will be described. Although conventional disc changers generally have five disc carrying areas, the disc changer 200 has only three disc carrying areas for simplicity.

FIGS. 46 and 47 are plan views of the disc changer 200.

As is illustrated in FIGS. 46 and 47, the disc changer 200 includes a housing 76 in which a disc can be played, a tray support 71 horizontally movable between a disc mounting position shown in FIG. 46 and a playing position shown in FIG. 47 to carry the disc d out of and into the housing 76, and a rotatable tray 72 provided on the tray support 71 and having three disc carrying areas 72a each for carrying a disc. The three disc carrying areas 72a are equally angularly spaced on the tray 72. The disc changer 200 further includes a disc player 73 provided at a predetermined position in the housing 76. The disc player 73 includes a turntable 74 driven by a motor (not shown) and an optical pickup 75 for optically detecting data written in the disc d. The tray support 71 has a rack gear 62 at a bottom surface thereof. The rack gear 62 is in engagement with a pinion 61 driven by a motor 60 provided in the housing 76. The horizontal movement of the tray support 71 is realized by the engagement of the rack gear 62 and the pinion 61.

The tray 72 includes a gear 77 integrally formed on a bottom surface thereof for rotating the tray 72, a central shaft 63 provided at the center thereof, and a driving gear 66 also provided at the bottom surface thereof and in engagement with the gear 77. The driving gear 66 is also in engagement with a deceleration mechanism including a belt 65, which is in engagement with a motor 64 having a rotation center 64a on the tray support 71. The driving force of the motor 64 is intended to be conveyed to the driving gear 66 through the deceleration mechanism including the belt 65 and then to the gear 77. Although not shown, the disc player 73 moves between an elevated position for playing the disc and a lowered position.

As is shown in FIG. 48, the tray support 71 includes a light emitting and detecting element 68 for detecting whether a disc d is placed or not. The light emitting and detecting element 68 is located at such a position that light from the light emitting and detecting element 68 is reflected by a surface of the disc d. The tray support 71 further includes two light emitting and detecting elements 69 for detecting the position where the tray 72 should stop (hereinafter, referred to as the "stopping position"). The two light emitting and detecting elements 69 are located so as to interpose a wall 67 integrally formed on a bottom surface of the tray 72 and having holes 67a. The two light emitting and detecting elements 69 are intended to detect the stopping position of the tray 72 by detecting the position of the holes 76a.

The disc changer 200 having the above-described structure operates in the following manner:

In FIG. 46, two of the three disc carrying areas 72a are outside the housing 76. For mounting three discs, two discs are first mounted, and then the motor 64 is energized by closing a switch to rotate the tray 72. Due to the detection of the stopping position by the light emitting and detecting elements 69, the tray 72 rotates by a minimum angle, namely 60 degrees in this case before stopping. In this state, the third disc is mounted. Then, the motor 60 is driven by closing a switch to horizontally move the tray support 71 to the playing position shown in FIG. 47.

When the disc changer 200 is at the playing position in FIG. 47, the tray support 71 can be horizontally moved by closing a switch to the disc mounting position shown in FIG. 46. However, if a disc is mounted on the disc carrying area 72a corresponding to the disc which is being played, these two discs bump into each other when the tray support 71 retracts to the playing position (FIG. 47). In order to avoid such an inconvenience, the motor 64 is controlled not to be energized by closing a switch if the tray support 71 is moved to the mounting position while a disc is being played.

The above-described conventional disc changer 200 has the following problems:

(1) In general, conventional rotation-system disc changers accommodate five discs each having a diameter of 120 mm. Such a large disc changer is appropriate for a large audio system having a width of 360 mm, but is not appropriate for a system having a width of 270 mm which is becoming popular in line with the recent trend of size reduction in the field of audio equipment. Referring to FIG. 46, for example, the outer diameter 2 R of the disc carrying area 72a is 120 mm. Accordingly, the outer diameter W1 of the tray 72 is 263 mm. The width W2 of the housing 76 should be at least 278 mm in consideration of the margins W3. This prevents all the apparatuses in an audio system from having a uniform width.

(2) For exchanging all the discs, two steps, namely, pulling out the tray support 71 and then rotating the tray 72 by closing a switch are necessary.

(3) When the tray support 71 is pulled out when a disc is being played, a different disc may be mounted undesirably on a disc carrying area 72a corresponding to the disc which is being played through a front opening of the housing 76 although rotation of the tray 72 is prohibited.

(4) Since electric parts and components such as the motors 60 and 64 and the light emitting and detecting elements 68 and 69 are provided in the vicinity of the tray 72, wire connections to the electric circuits in the mechanism support 20 are complicated, and the number of components and thus the size of the disc changer 200 are increased.

(5) Two motors which do not operate simultaneously, namely, the motor 64 provided with the deceleration mechanism for rotating the tray 72 and the motor 60 for moving the tray support 71 are necessary, which increase the size of the disc changer 200 and the number of the components.

(6) When the disc changer 200 is at the disc mounting position, the area of the wall around the disc accommodated in the housing 76 is small. Accordingly, the disc may slip from the disc carrying area 72a by moving or lightly vibrating the disc changer 200.

SUMMARY OF THE INVENTION

A disc changer according to the present invention includes a tray support horizontally movable between a disc mounting position and a playing position in a housing; a rotation shaft on the tray support; and a tray rotatable around the rotation shaft and having a plurality of disc carrying areas each for carrying a disc, the disc carrying areas being equally angularly spaced. The tray has a generally polygonal profile, and the tray support has a width which is shorter than the effective diameter of the tray.

Thus, the invention described herein makes possible the advantage of providing an easy-to-use disc changer having a small size, a small number of components and an identical width of the other apparatuses in an audio system.

This and other advantages of the present invention will become apparent to those skilled in the art upon reading and understanding the following detailed description with reference to the accompanying figures.

BRIEF DESCRIPTION OF THE DRAWINGS

FIGS. 9 through 11 are side views of the tray support, the tray table and the mechanism support of the disc changer showing each step of operation.

FIGS. 12 through 14 are plan views of the tray support and the tray of the disc changer showing each step of operation.

FIG. 19 is a plan view of the disc changer where a disc player is in a playing state.

FIG. 20 is a plan view of the disc changer where a disc player is in a non-playing state.

FIGS. 21 through 23 are cross sectional views of the mechanism support looking along section lines 21—21, 22—22 and 23—23 in FIG. 15, respectively.

FIGS. 32 through 37 are plan views of a driving gear showing each step of operation thereof.

FIG. 44 is a graph illustrating the pulses and timing of the pulses outputted from light emitting and detecting elements of the disc changer.

FIG. 45 is a front view of the housing of the disc changer to show a front opening.

DESCRIPTION OF THE PREFERRED EMBODIMENTS

Hereinafter, the present invention will be described by way of an illustrative example with reference to the accompanying drawings.

Figure 1:
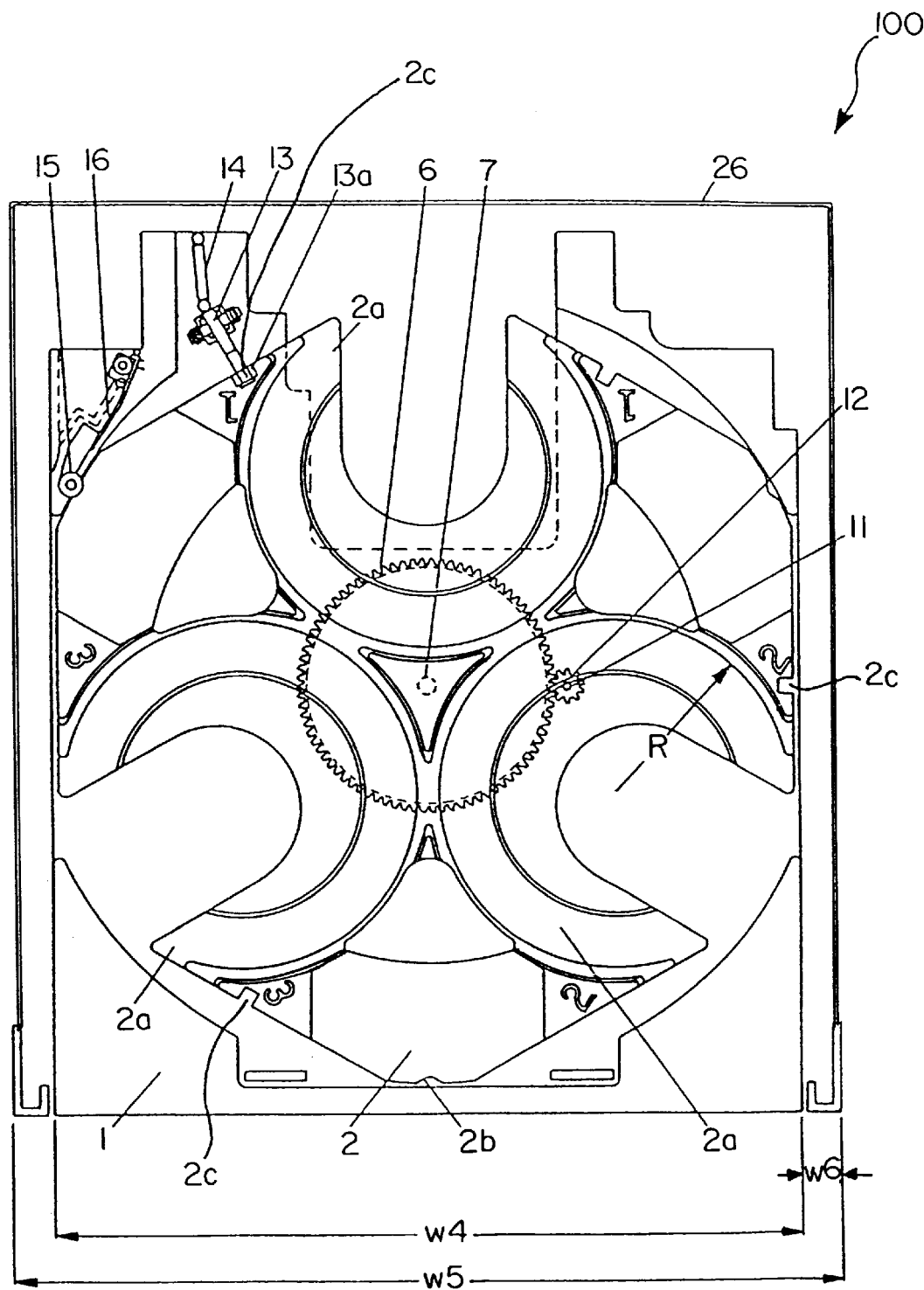
FIG. 1 is a plan view of a tray and the elements in the vicinity of the tray of a disc changer according to the present invention.
Figure 2:
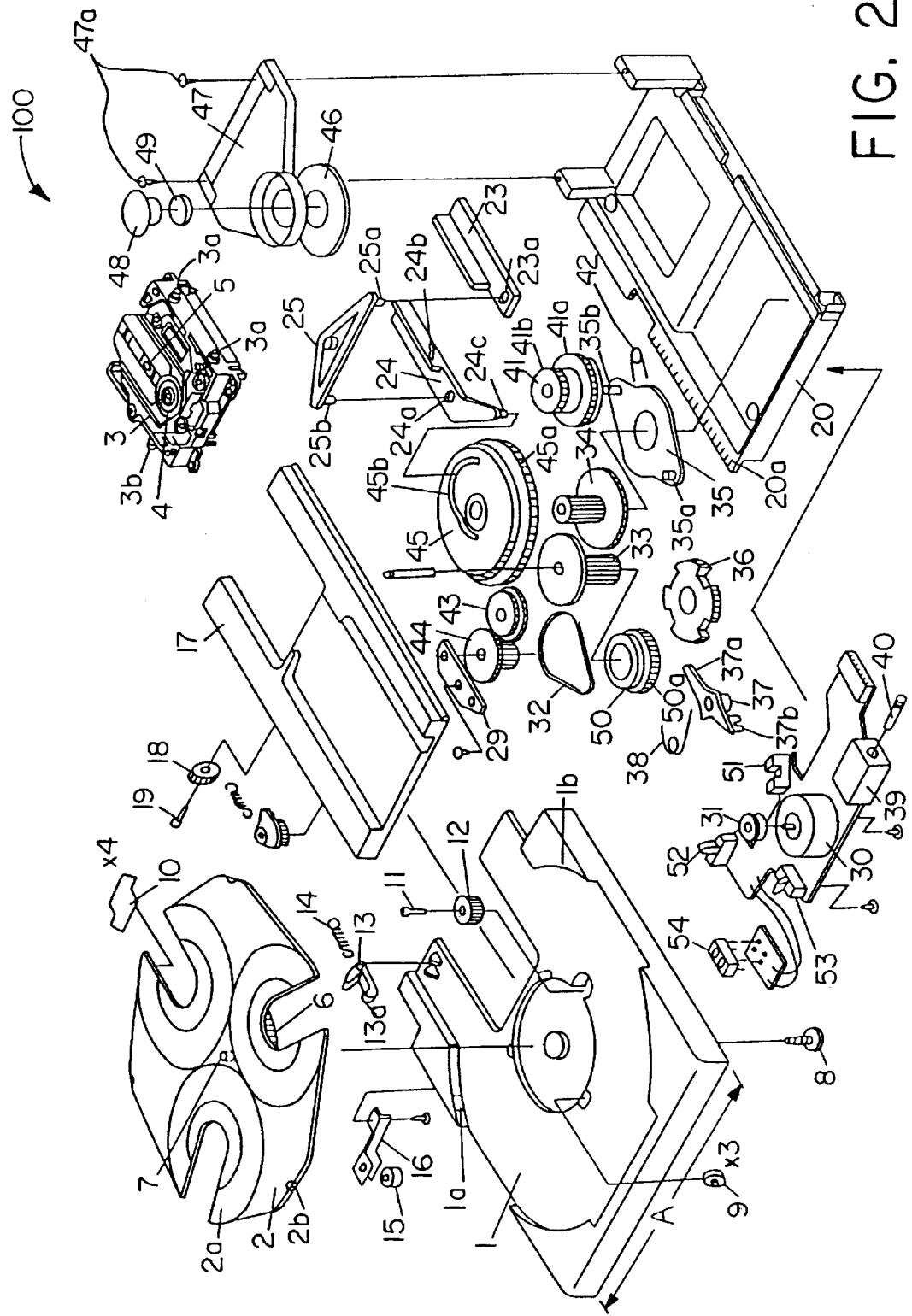
FIG. 2 is an exploded isometric view of the disc changer according to the present invention.

FIG. 1 is a plan view of a disc changer 100 according to the present invention, and FIG. 2 is an exploded isometric view of the disc changer 100.

As is illustrated in FIGS. 1 and 2, the disc changer 100 includes a housing 26 in which a disc (not shown) can be played, a tray support 1 horizontally movable between a disc mounting position and a playing position to carry the disc: out of and into the housing 26, and a rotatable tray 2 provided on the tray support 1 and having three disc carrying areas 2a each for carrying a disc. The three disc carrying areas 2a are equally angularly spaced on the tray 2.

As is shown in FIG. 1, the profile of the tray 2 is generally polygonal. The tray support 1 has width W4 which is approximately equal to four times of the radius R of the disc. Width W4 is, for example, 244.0 mm although the effective diameter of the tray 2 is 263 mm as in the conventional disc changer 200. (In this specification, the "effective diameter" means twice the maximum distance between the center and the outer periphery of the tray 2.) Accordingly, the width W5 of the housing 26 can be, for example, 270.0 mm, considering an acceptable or sufficient margin w6 for accommodating the rotation of the tray 2.

As is illustrated in FIG. 2, the disc changer 100 further includes a disc player 3 provided at a predetermined position of the housing 26. The disc player 3 includes a turntable 4 driven by a motor (not shown) and an optical pickup 5 for optically detecting data written in the disc.

The disc changer 100 further includes a tray table 17 for carrying the tray support 1 and a mechanism support 20 having a mechanism for rotating the tray 2 and the like thereon.

Figure 3:
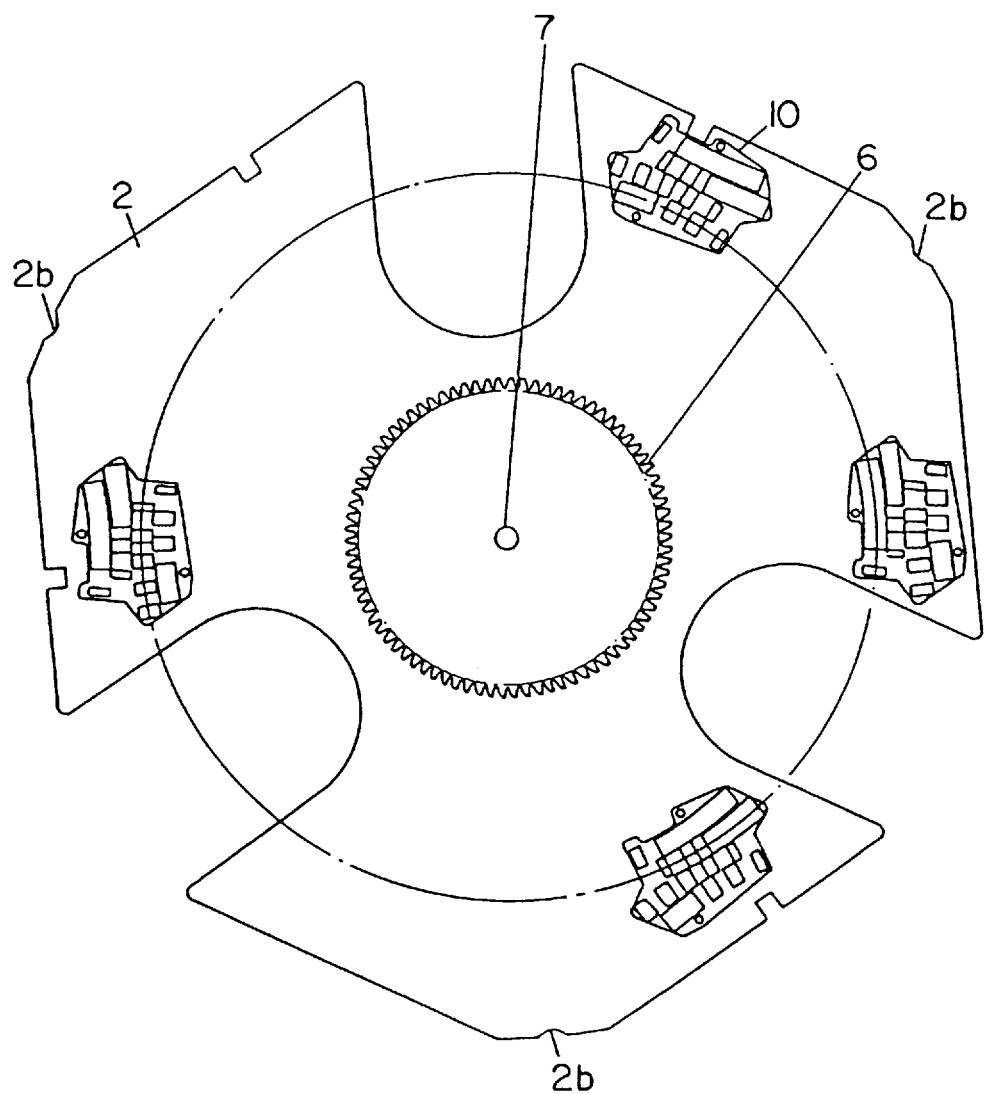
FIG. 3 is a bottom view of the tray shown in FIG. 1.

FIG. 3 is a bottom view of the tray 2. As is illustrated in FIG. 3, the tray 2 includes a gear 6 integrally formed with the tray 2 and a rotation shaft 7 provided at a center of the tray 2. As is illustrated in FIG. 2, the rotation shaft 7 is attached to the tray support 1 by a pin 8 so that the tray 2 is rotatable on the tray support 1 by rollers 9 supported by the tray support 1. The gear 6 is always in engagement with a connection gear 12 supported by the tray support 1 through a pin 11. The tray 2 further includes four reflection plates 10

(FIG. 3) an a bottom surface thereof for detecting the stopping position of the tray 2 (described in detail later).

Figure 4:
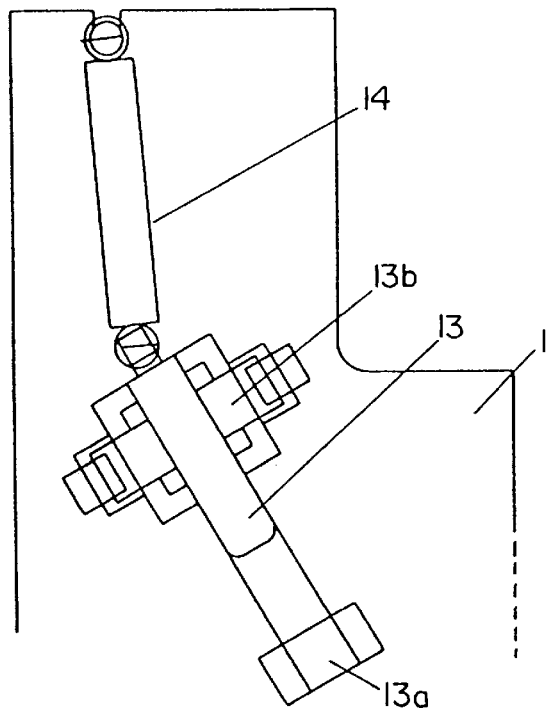
FIG. 4 is a plan view of a lock lever shown in FIG. 1.
Figure 5:
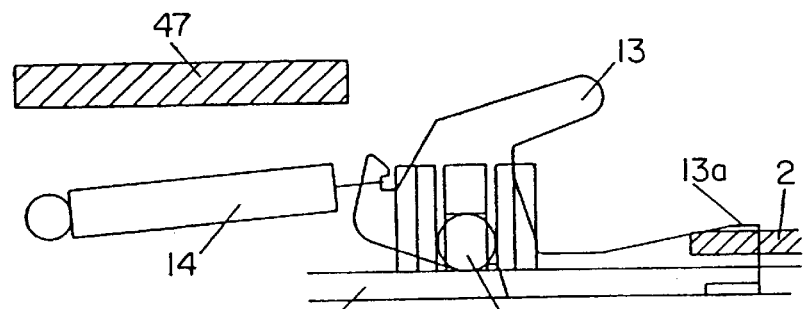
FIG. 5 is a side view of the lock lever shown in FIG. 4 in the state where a tray support is outside a housing.
Figure 6:
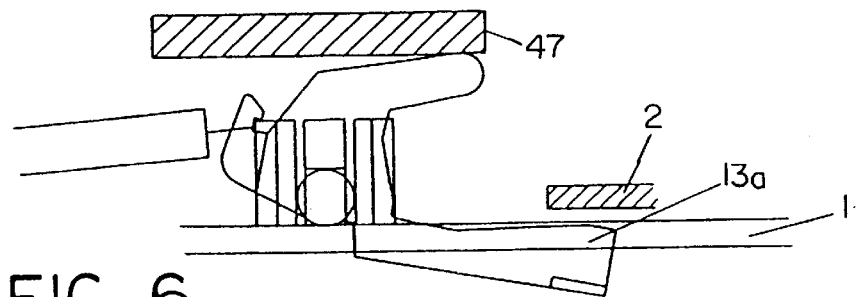
FIG. 6 is a side view of the lock lever shown in FIG. 4 in the state where the tray support is inside the housing.

A pivotable lock lever 13 (FIG. 1) is illustrated in detail in FIGS. 4 through 6. As is illustrated in FIG. 4 (enlarged plan view), the lock lever 13 has an end 13a and a shaft 13b. The shaft 13b is supported by the tray support 1. The lock lever 13 is biased by a spring 14 so that the end 13a can engage a recess 2c of the tray 2. FIG. 5 is a side view of the lock lever 13 when the tray support 1 is outside the housing 26. In the state shown in FIG. 5, the end 13a of the lock lever 13 is in engagement with the recess 2c, and thus the tray 2 does not rotate. FIG. 6 is a side view of the lock lever 13 when the tray support 1 is inside the housing 26. In the state shown in FIG. 6, the lock lever 13 is pivoted by a fixed portion 20d of a mechanism support 20 and thus comes out of engagement with the recess 2c. As is shown here, the tray 2 can be rotated only when it is at the playing position.

As is shown in FIGS. 1 and 2, a roller 15 is attached to a bottom surface of the tray support 1 through a leaf spring 16. The roller 15 is biased toward a peripheral surface of the tray 2 through an opening 1a of the tray support 1 to engage one of three recesses 2b of the tray 2 to serve to stop the tray 2.

Figure 7:
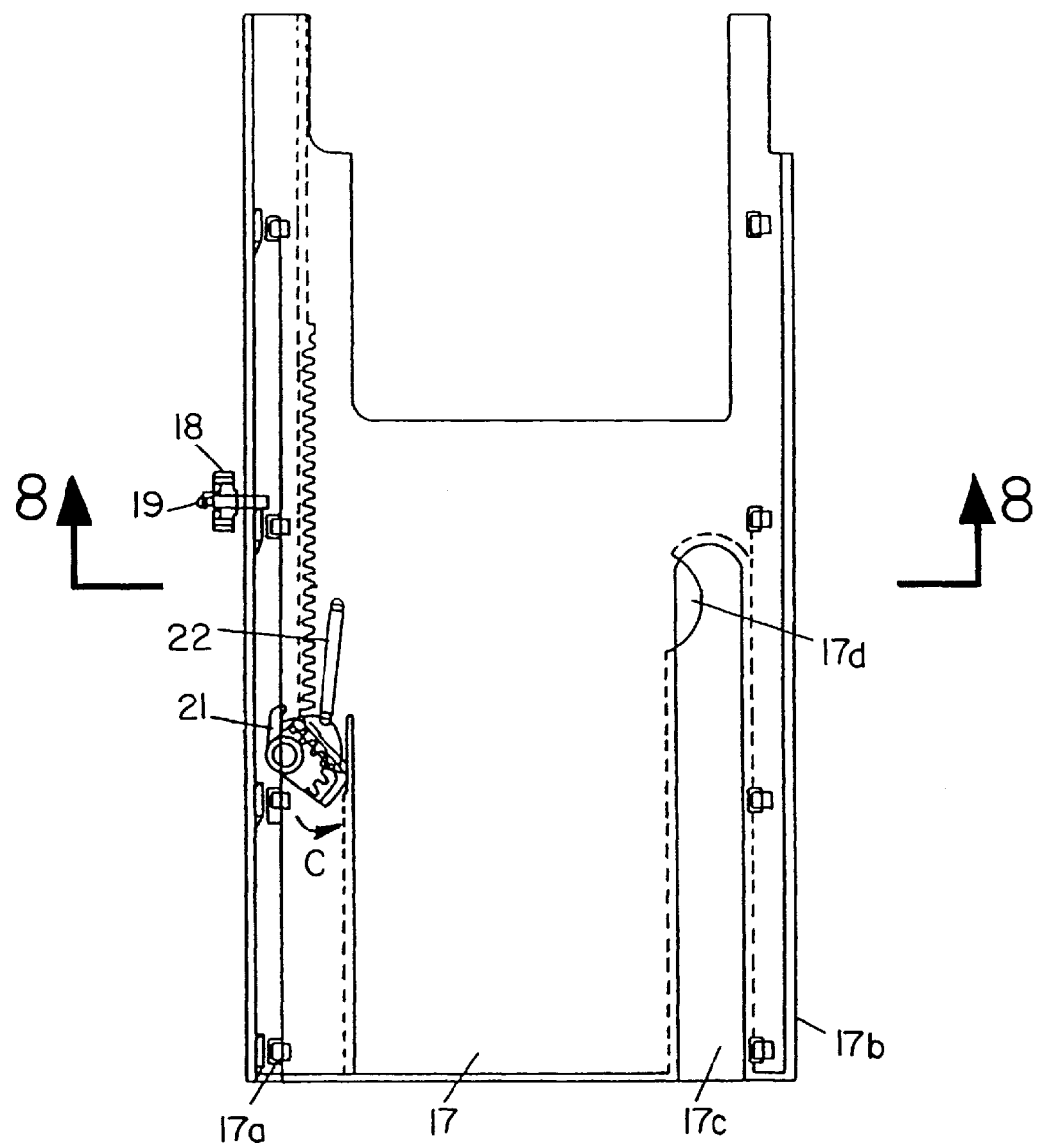
FIG. 7 is a plan view of a tray table of the disc changer.

The tray table 17 shown in FIG. 2 is illustrated in detail in FIG. 7 (enlarged plan view). As is shown in FIG. 7, the table 17 has a plurality of projections 17a along two longitudinal side perimeters thereof. The projections 17a are intended to engage a projection 1d (FIG. 8) on the bottom surface of the tray support 1. Thus, the tray support 1 can slide with respect to the tray table 17.

Figure 8:
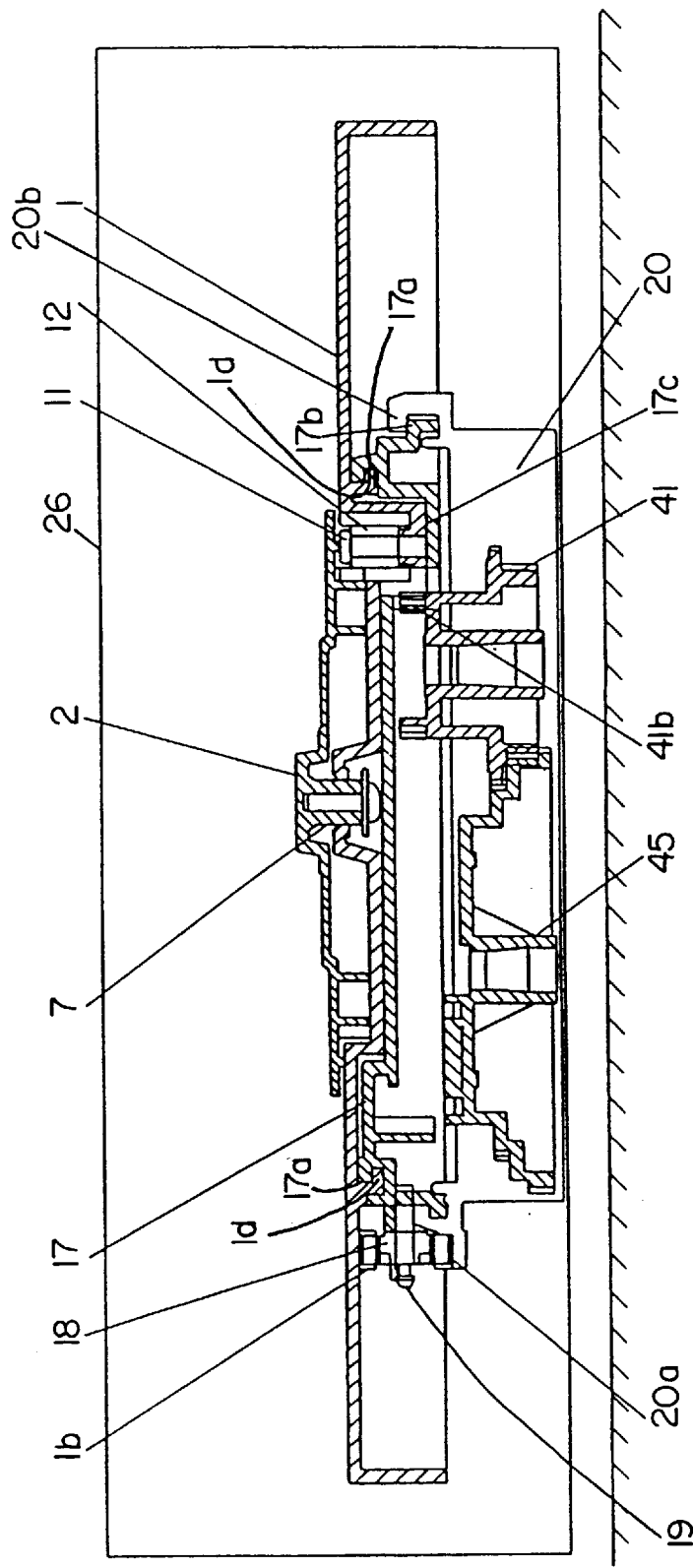
FIG. 8 is a cross sectional view of the tray support, the tray table and a mechanism support of the disc changer looking along section line 8—8 in FIG. 7.

FIG. 8 is a cross sectional view of the tray support 1, the tray table 17 and the mechanism support 20 looking along section line 8—8 in FIG. 7. FIGS. 9 through 11 are side views illustrating the engagement of the tray support 1, the tray table 17 and the mechanism support 20. As is shown in FIGS. 8 through 11, the tray table 17 has an acceleration gear 18 supported by the tray table 17 through a shaft 19. The acceleration gear 18 is in engagement with a rack gear 1b provided on the bottom surface of the tray support 1 and also with a rack gear 20a provided on a top surface of the mechanism support 20. The tray table 17 further includes a lock gear 21 (FIG. 7) which is pivotably attached to a bottom surface of the tray table 17 and is biased inward as is indicated by arrow C by a spring 22. One of the longitudinal side perimeters 17b of the tray table 17 is in engagement with a projection 20b of the mechanism support 20 (FIG. 8) to allow the tray table 17 to be slidable with respect to the mechanism support 20.

Further, as is shown in FIG. 7, the tray table 17 has a groove 17c and an opening 17d. As is shown in FIG. 8, the connection gear 12 supported by the tray support 1 is intended to move along the groove 17c and to rotate in the opening 17d to engage teeth 41b of a gear 41 provided on the mechanism support 20.

The operation of the tray support 1, the tray 2, the tray table 17 and the mechanism support 20 will be described with reference to FIGS. 9 through 14.

FIGS. 12 through 14 are plan views of the tray support 1, the tray 2, and the tray table 17.

In FIG. 9, the tray support 1 and the tray table 17 are at the playing position (corresponding to the state in FIG. 12) in FIG. 10, these two elements 1 and 17 are in a first disc mounting position where two disc carrying areas 2a not carrying a disc which is being played are outside the housing 26 (corresponding to the state in FIG. 13) and in FIG. 11, these two elements 1 and 17 are in a second disc mounting position where all the three disc carrying areas 2a are outside the housing 26 (corresponding to the state in FIG. 14). From the state shown in FIG. 12, the tray support 1 moves by distance M to the state shown in FIG. 13, and by distance N to the state shown in FIG. 14. Owing to the acceleration gear 18, the tray table 17 moves only by distance M/2 from the state in FIG. 12 to the state in FIG. 13, and only by distance N/2 from the state in FIG. 12 to the state in FIG. 14.

Figure 15:
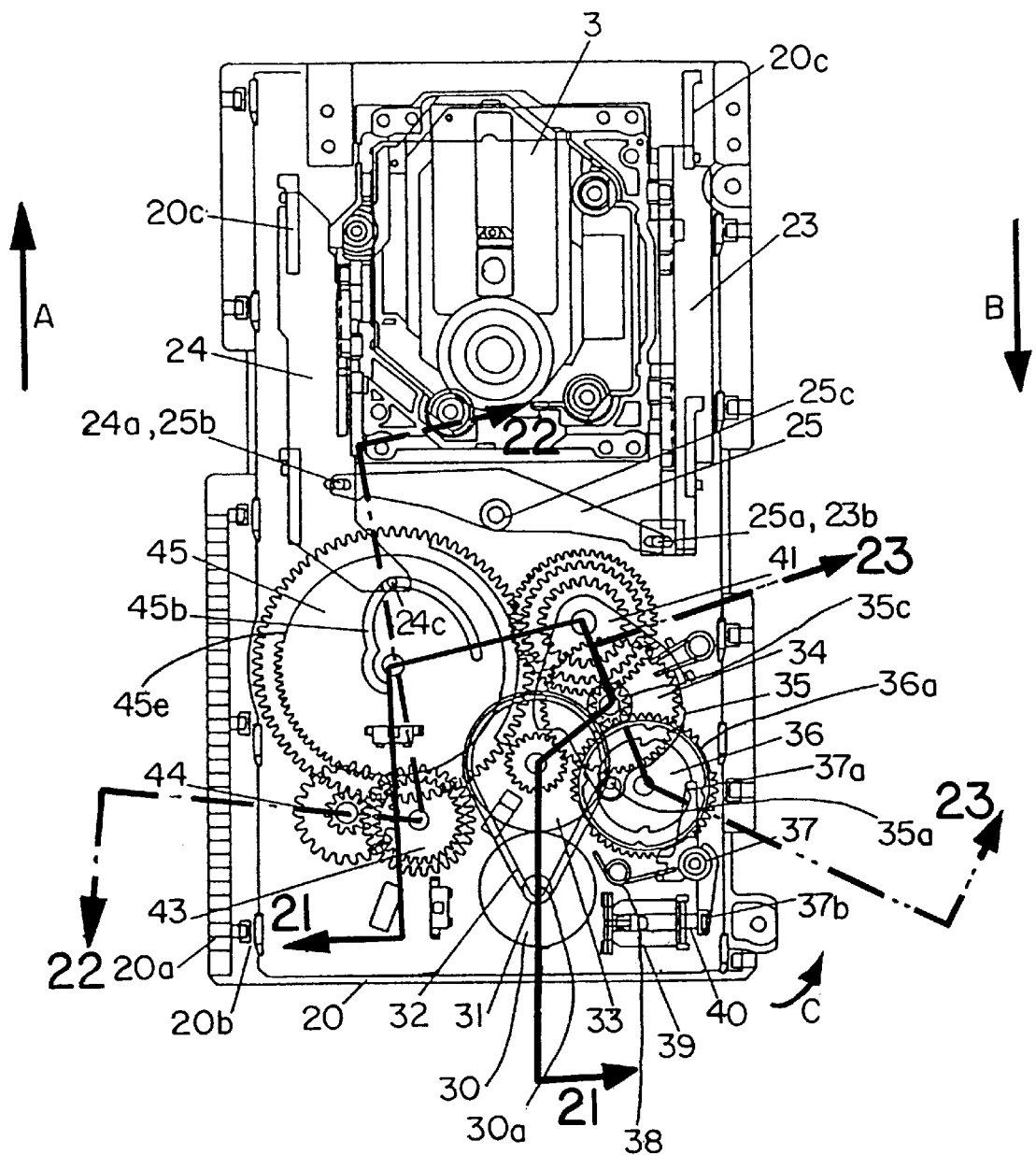
FIG. 15 is a plan view of the mechanism support of the disc changer to especially show a mechanism for rotating the tray of the disc changer.

With reference to FIGS. 2 and 15, the mechanism support 20 will be described. FIG. 15 is a plan view of the mechanism support 20.

The mechanism support 20 includes plates 23 and 24 which are in engagement with grooves 20c provided on the mechanism support 20 to be horizontally slidable. A lever 25 is pivotably attached to the mechanism support 20 by a shaft 25c. The lever 25 has an end 25a in engagement with a hole 23a of the plate 23 and another end 25b in engagement with a hole 24a of the plate 24. By such engagement, the plates 23 and 24 slide in the opposite directions from each other.

Figure 16:
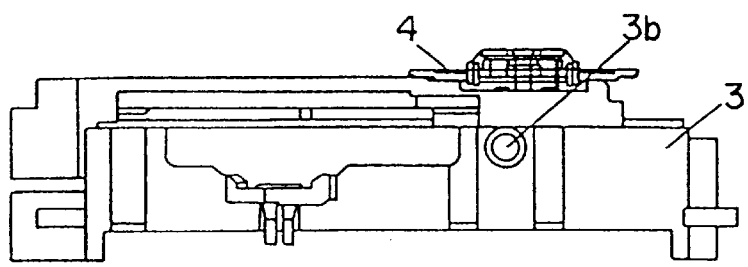
FIG. 16 is a side view of a disc player of the disc changer.
Figure 17:
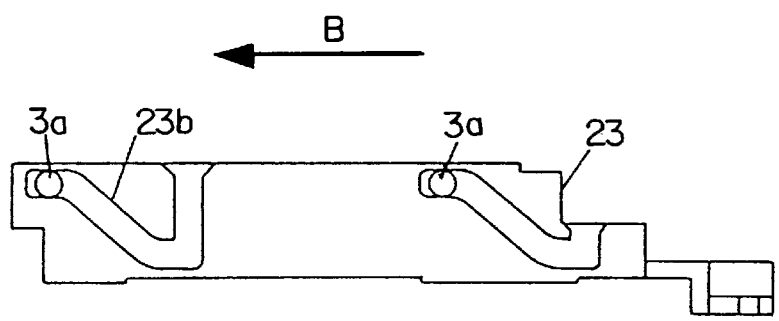
FIGS. 17 and 18 are side views of the plates and the disc player of the disc changer.
Figure 18:
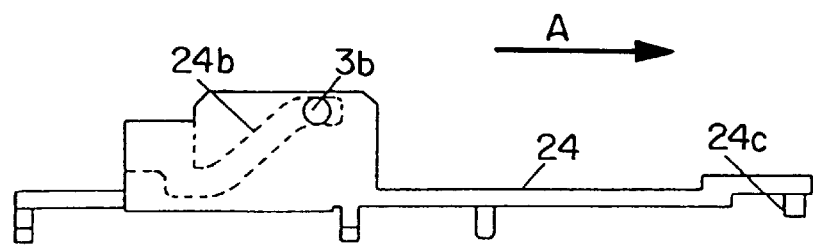

FIG. 16 is a side view of the disc player 3. FIGS. 17 and 18 are side view of the plates 23, 24 and the disc player 3.

As is shown in FIG. 17, the plate 23 has cam grooves 23b along a longitudinal side perimeter thereof. As is shown in FIG. 18, the plate 24 has a cam groove 24b along a longitudinal side perimeter thereof. Projections 3a of the disc player 3 are in engagement with the cam grooves 23b, respectively. Another projection 3b of the disc player 3 is in engagement with the cam groove 24b. When the plate 24 slides toward the disc player 3 as is indicated by arrow A, the plate 23 is intended to slide toward the mechanism support 20 as is indicated by arrow B to raise the disc player 3 by such engagement to a playing state as is also shown in FIG. 19. When the plates 23 and 24 move in the opposite direction, the disc player 3 is lowered to a non-playing state as is shown in FIG. 20.

With reference to FIGS. 2, 15 and 21 through 23, a rotation mechanism of the disc changer 100 will be described. FIGS. 21 through 23 are cross sectional views of the mechanism support 20 looking along section lines 21—21, 22—22 and 23—23 in FIG. 15, respectively.

The mechanism support 20 includes a motor 30 and a pulley 31 inserted into a shaft 30a of the motor 30. The rotation of the motor 30 is intended to be conveyed to a gear 33 through a belt 32, and the rotation of the gear 33 is further intended to be conveyed to a gear 34. A cam gear 36 including a toothless area 36a having no teeth is in engagement with the gear 34, and is intended to stop in the state of being engaged with an end 37a of a lock lever 37 in such a position as to allow the toothless area 36a to be opposed to the gear 34. The lock lever 37 is biased counterclockwise (arrow C) by a spring 36. Another end 37b of the lock lever 37 is in engagement with a movable piece 40 of an electromagnet 39. A lever 35 is rotatable around a shaft 35c which is concentric with the gear 34. A projection 35a at an end of the lever 35 is in engagement with a cam surface of the cam gear 36 to pivot the lever 35.

Figure 26:
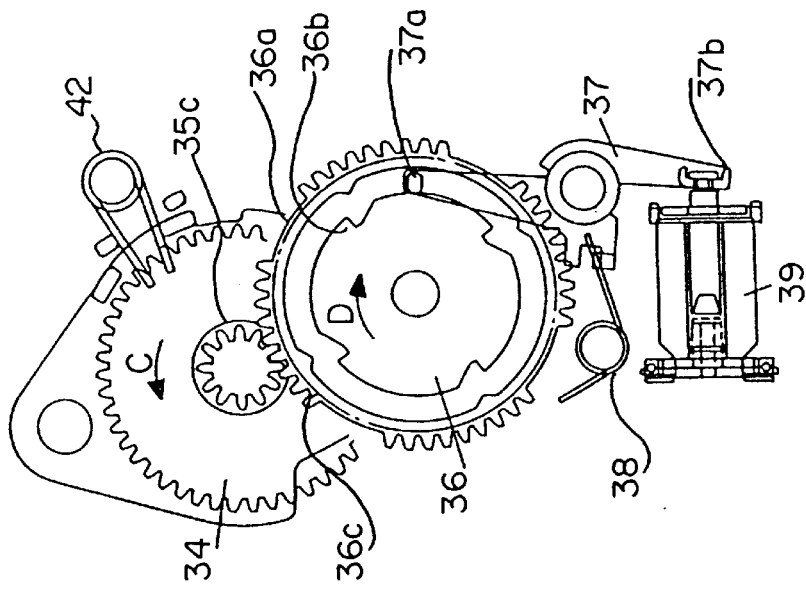
FIGS. 24 through 26 are plan views of a clutch mechanism including a cam gear and a lever, illustrating each step of operation of the clutch mechanism.
Figure 29:
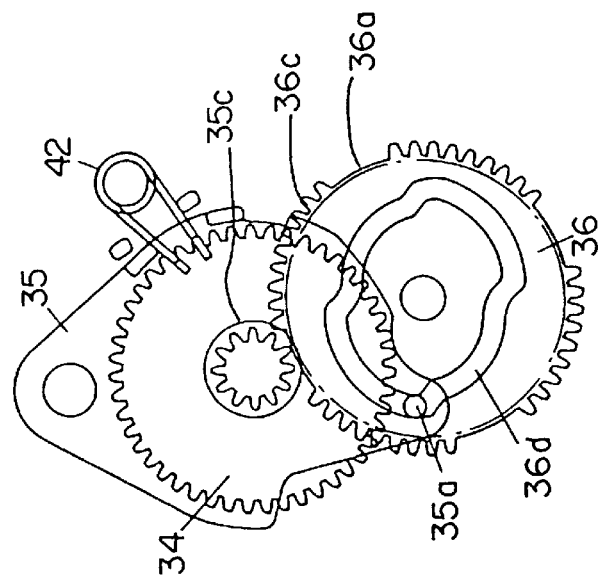
FIGS. 27 to 29 are plan views of the clutch mechanism especially showing the positional relationship between the lever and the cam gear.
Figure 28:
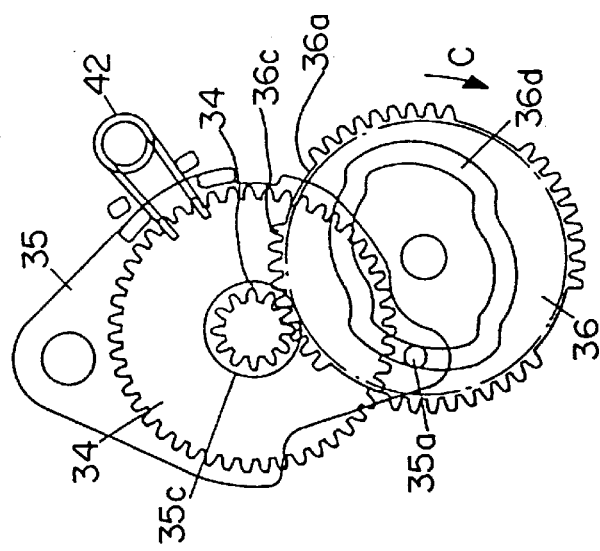
Figure 27:
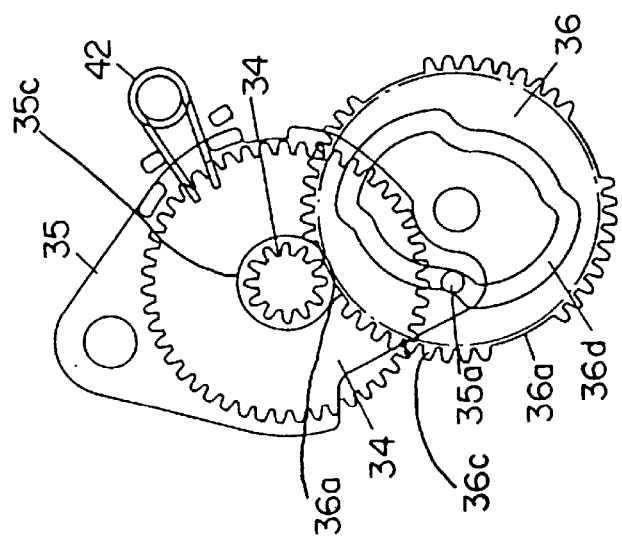

The operation of the cam gear 36 and the elements associated therewith will be described with reference to FIGS. 24 through 29. FIGS. 24 through 29 are plan views of a clutch mechanism including the cam gear 36 and the lever 35 illustrating each step of operation. In FIGS. 27 to 29, the cam gear 36 is shown as being transparent to especially show the positional relationship between the lever 35 and the cam gear 36.

Figure 25:
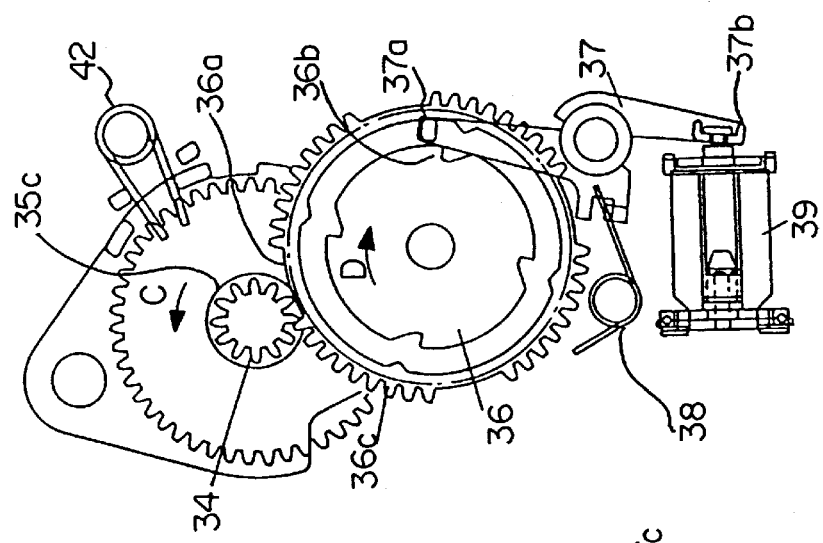
Figure 24:
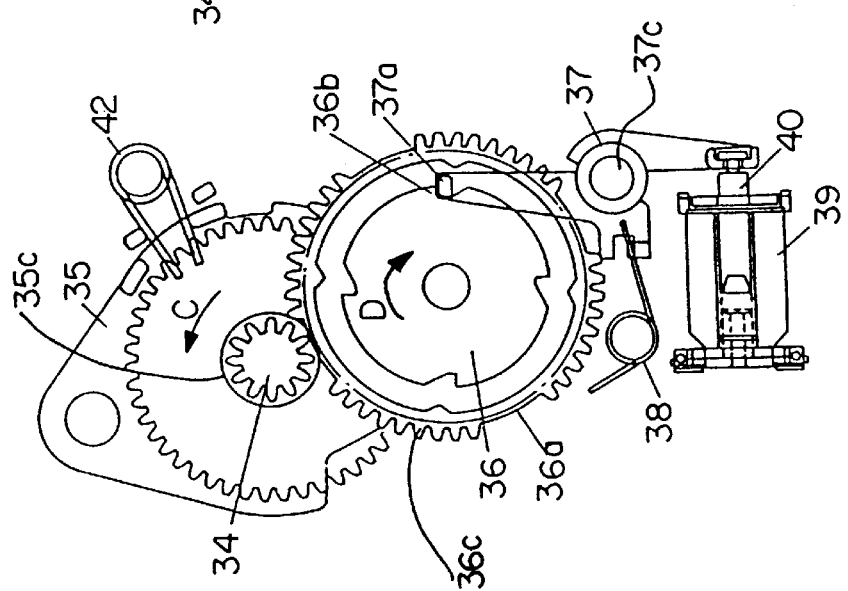

In FIG. 24, the cam gear 36 stops and is locked by the end 37a of the lock lever 37 engaging a projection 36b of the cam gear 36 by the biasing force of the spring 38. The toothless area 36a of the cam gear 36 and the gear 34 are opposed to each other. When the electromagnet 39 is turned ON to pull the movable piece 40 leftward in FIG. 24, the lock lover 37 pivots clockwise around a shaft 37c against the force of the spring 38. Therefore, as is shown in FIG. 25, the end 37a of the lock lever 37 is released from the engagement with the projection 36b of the cam gear 36. Then, the cam gear 36 rotates clockwise as is shown by arrow D in FIGS. 25 and 26 by the biasing force of the lever 35 which will be described later in detail. As a result, teeth 36c of the cam gear 36 and the gear 34 engage each other as is shown in FIG. 26. The cam gear 36 keeps rotating until the next toothless area is opposed to the gear 34, namely, until the end 37a of the lock lever 37 engages the next projection 36b to lock cam gear 36.

While the cam gear 36 is in the state illustrated in FIG. 24, the projection 35a is engaged with a cam groove 36d of the cam gear 36 as is shown in FIG. 27. The lever 35 is biased clockwise by a spring 42. By this biasing force of the lever 35, the cam gear 36 rotates clockwise. When the electromagnet 39 is turned ON, the teeth 36c of the cam gear 36 engage the gear 34 as is mentioned above and also illustrated in FIG. 25. During the engagement of the driving gear 34 and the teeth 36c, the lever 35 pivots through the engagement of the projection 35a along the cam groove 36d in the cam gear 36 as is shown in FIG. 28. When the next toothless area is opposed to the gear 34, the lever 35 stops in the state of being biased counterclockwise by the spring 42 as is shown in FIG. 29. In this manner, each time the electromagnet 39 is turned ON, the lever 35 pivots between the two positions illustrated in FIGS. 27 and 29. The driving force of the gear 34 is conveyed to other elements of the rotation mechanism when the lever 35 is at these two locked positions.

Figure 30:
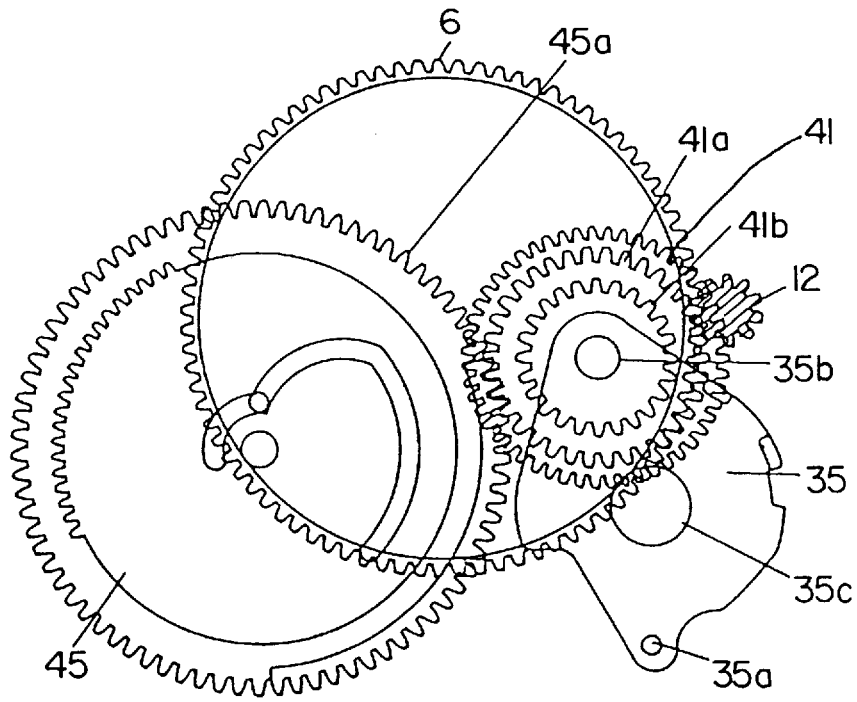
FIGS. 30 and 31 are plan views of the lever illustrating two locked positions of the lever.
Figure 31:
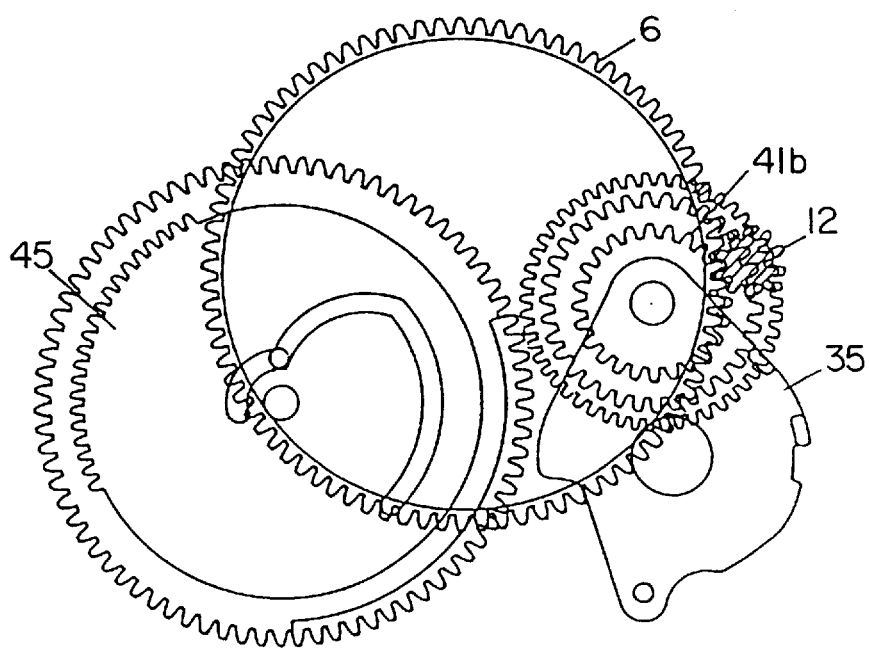
Figure 34:
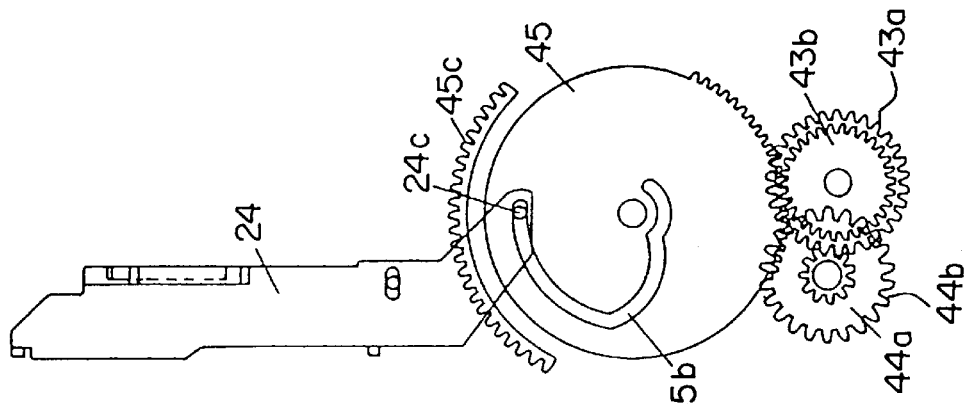
Figure 33:
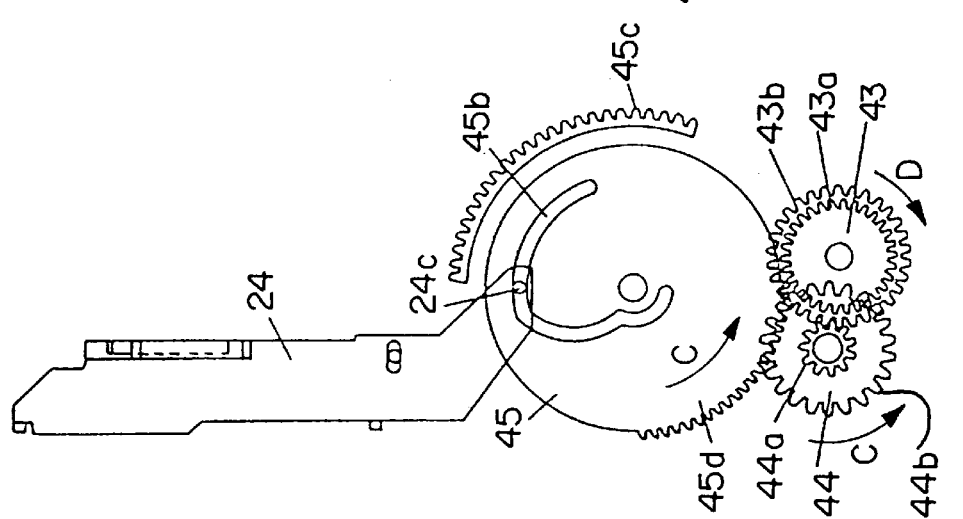

FIGS. 30 and 31 especially show the lever 35 at these two locked positions. As mentioned above, the gear 41 is supported by an end 35b of the lever 35. When the lever 35 pivots to the position shown in FIG. 30, the teeth 41a of the gear 41 engage teeth 45a of a driving gear 45. When the lever 35 pivots to the position shown in FIG. 31, the teeth 41a of the gear 41 engage the connection gear 12 at the playing position. The cam gear 36 rotates only clockwise to switch the lever 35 between these two positions. Accordingly, the moment when the lever 35 is switched, the gear 41 also rotates clockwise. Once the lever 35 is stopped or locked at one of the positions shown in FIGS. 30 and 31, the motor 30 can be rotated in either direction.

As is shown in FIGS. 2, 15 and 21 through 23, the driving gear 45, a gear 43, and a gear 44 are supported by the mechanism support 20. The gear 44 is fixed to a fixed plate 29. The gears 43 and 44 are constantly in engagement with each other. The driving gear 45 has toothless areas 45e so that there is a period during which only the gear 43 engages the driving gear 45, and there is another period during which only the gear 44 engages the driving gear 45. The driving gear 45 has a cam groove 45b, which is in engagement with a projection 24c provided at an end of the plate 24. By such engagement, when the driving gear 45 rotates, the plates 24 and 23 are intended to slide to raise or lower the disc player 3 as described above with reference to FIGS. 19 and 20.

With reference to FIGS. 32 through 37, the operation of the driving gear 45 will be described in detail. In FIGS. 32 through 37, the gears are shown as being transparent for simplicity.

Figure 32:
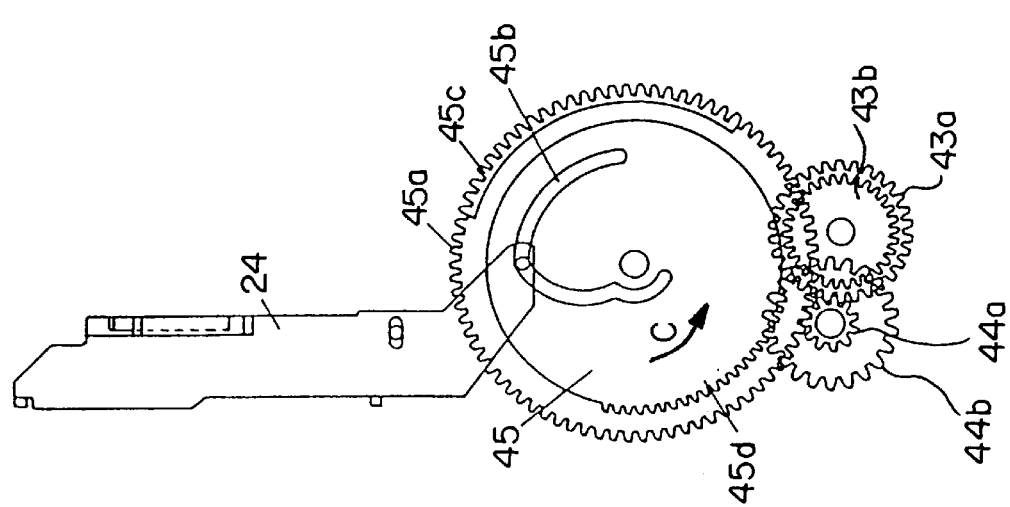

In FIG. 32, the driving gear 45 is in the playing state also shown in FIG. 19. The driving gear 45 includes teeth 45a, teeth 45c which are identical in shape with but different in height and number from the teeth 45a, and teeth 45d provided at a shorter distance from the center of the gear 45 than the teeth 45a and 45c. In FIGS. 33 through 37, the teeth 45a of the driving gear 45 are omitted for simplicity. The gear 43 has top teeth 43b and bottom teeth 43a provided at a farther distance from the center of the gear 43 than the top teeth 43b. The gear 44 has top teeth 44b and bottom teeth 44a provided at a shorter distance from the center of the gear 43 than the top teeth 44b. The top teeth 43b of the gear 43 and the bottom teeth 44a of the gear 44 are in engagement with each other. When the driving gear 45 rotates counterclockwise as is indicated by arrow C from the state shown in FIG. 32 to the state shown in FIG. 33, the teeth 45d start engaging bottom teeth 43a of the gear 43 to rotate the gear 43 clockwise as is indicated by arrow D. The top teeth 43b rotate along with the bottom teeth 43a, and the rotation of the top teeth 43b is conveyed to the bottom teeth 44a of the gear 44, and thus the top teeth 44b rotate counterclockwise as is indicated by arrow C.

Figure 38:
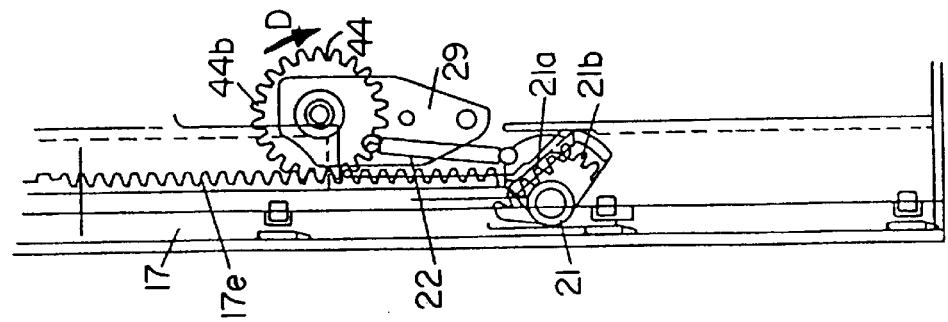

Briefly referring to FIG. 38, the gear 44 and a rack gear 17e provided along the longitudinal side perimeter 17b of the tray table 17 engage each other. By such engagement, when the gear 44 rotates counterclockwise, the tray table 17 moves toward the mechanism support 20 (as is indicated by arrow B in FIG. 15). Until the gear 44 rotates to the state in FIG. 34, the cam groove 45b rotates with the rotation of the driving gear 45, and the disc player 3 is maintained in the playing state. The driving gear 45 rotates to move the tray table 17 by distance M/2 (FIG. 13). When the driving gear 45 rotates clockwise, the plate 24 goes back to the state in FIG. 32. When the driving gear 45 rotates further clockwise, the plate 24 moves (is drawn) toward the mechanism support 20 (arrow B) to put the disc player 3 in the non-playing state shown in FIG. 35 (also shown in FIG. 20).

When the driving gear 45 rotates further clockwise from the state in FIG. 35 to the state in FIG. 36, the teeth 45c start engaging the bottom teeth 44a of the gear 44, thereby rotating the top teeth 44b counterclockwise as is indicated by arrow C. By the engagement of the teeth 44b and the rack gear 17e of the tray table 17, the tray table 17 moves toward the mechanism support 20 (arrow B in FIG. 15). Until the state in FIG. 37, the cam groove 45b rotates with the rotation of the driving gear 45, and the disc player 3 is maintained in the non-playing state. The driving gear 45 rotates to move the tray table 17 by distance N/2 (FIG. 14). When the driving gear 45 rotates clockwise, the plate 24 goes back to the state in FIG. 35.

With reference to FIGS. 38 through 42, the engagement of the tray table 17 and the gear 44 will be described in detail.

Figure 42:
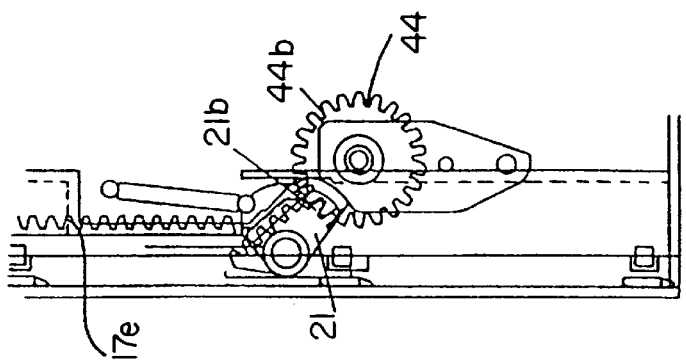
FIGS. 38 through 42 are plan views Illustrating gear engagement for moving the tray table of the disc changer.
Figure 41:
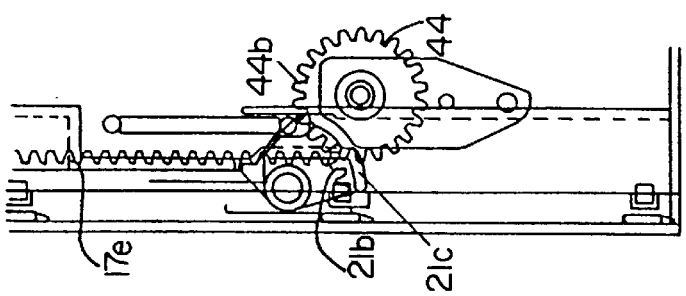
Figure 40:
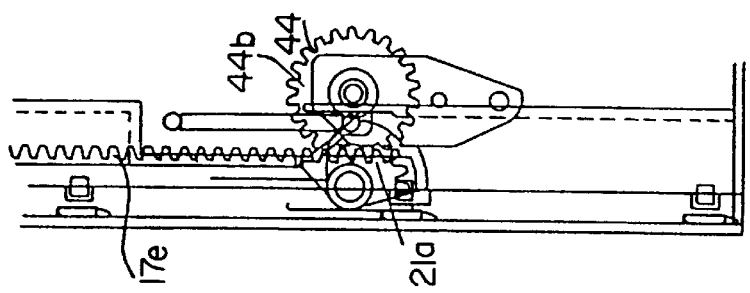
Figure 39:
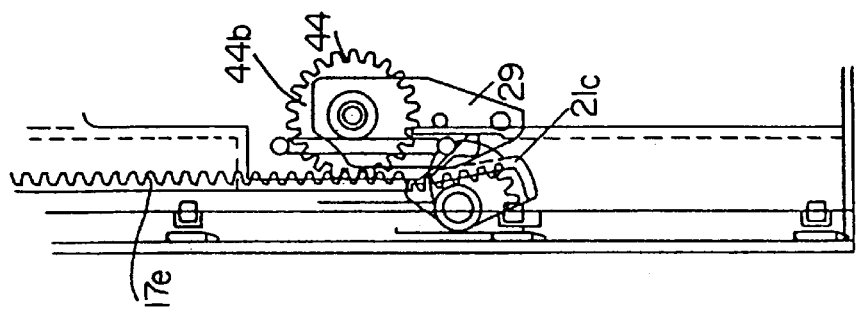

As is shown in FIG. 38, in the state where the tray table 17 is closest to the mechanism support 20, the top teeth 44b of the gear 44 are in engagement with the rack gear 17e of the tray table 17 and also are in connection with the lock gear 21 through the spring 22. When the top teeth 44b rotate clockwise as is indicated by arrow D, the tray table 17 moves toward the disc player 3. When the tray table 17 reaches the state shown in FIG. 39 (corresponding to FIG. 33), a corner 21c of the lock gear 21 contacts the fixed plate 29 and rotates clockwise (arrow D). When the lock gear 21 reaches the state shown in FIG. 40 (corresponding to FIG. 32), a rack gear 21a of the lock gear 21 and the upper teeth 44b engage each other. When the lock gear 21 reaches the state shown in FIG. 41 (corresponding to FIG. 35), the lock gear 21 is released from the engagement with the fixed plate 29, thus a curved gear portion 21b of the lock gear 21 engages the upper teeth 44b. The lock gear 21 rotates counterclockwise by the biasing force of the spring 22, thereby locking the gear 44 as is illustrated in FIG. 42 (corresponding to FIG. 36). In this state, the gear 44 is prohibited from rotating and thus the tray table 17 cannot move toward the mechanism support 20. When the gear 44 rotates counterclockwise, the lock gear 21 and the tray table 17 move oppositely from the above-described manner, thereby moving the tray table 17 toward the mechanism support 20.

Going back to FIG. 2, reference numeral 46 denotes a clamper. A magnet 49 is provided on the damper 46 and is fixed by a fixing plate 48. The assembly including the clamper 46 and the magnet 49 is supported by a clamping plate 47, and is intended to hold a disc between the clamper 46 and the turntable 4 by the force of the magnet 49 when the disc player 3 is in the playing state. The clamping plate 47 is fixed to the mechanism support 20 through pins 47a.

Figure 43:
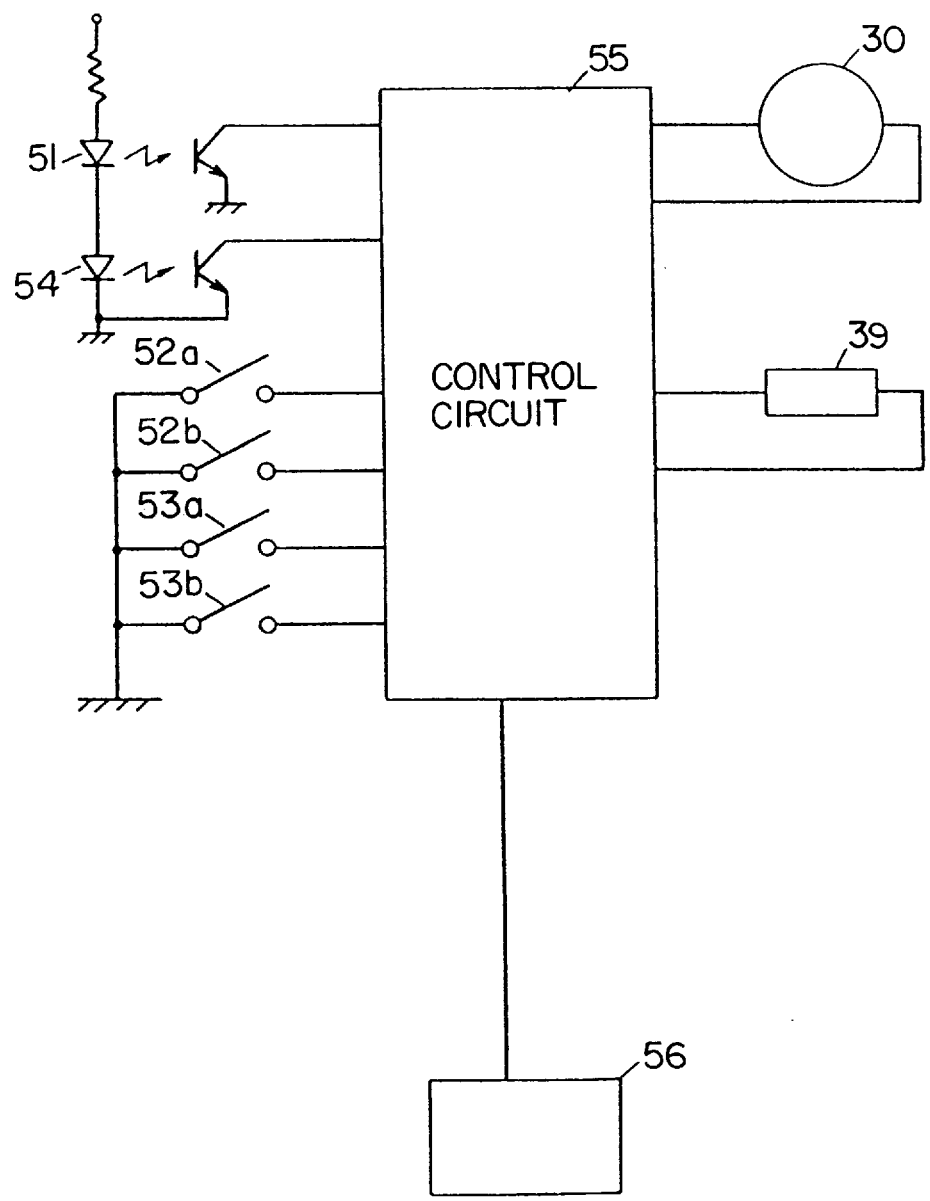
FIG. 43 is a circuit diagram of the disc changer.
Figure 46:
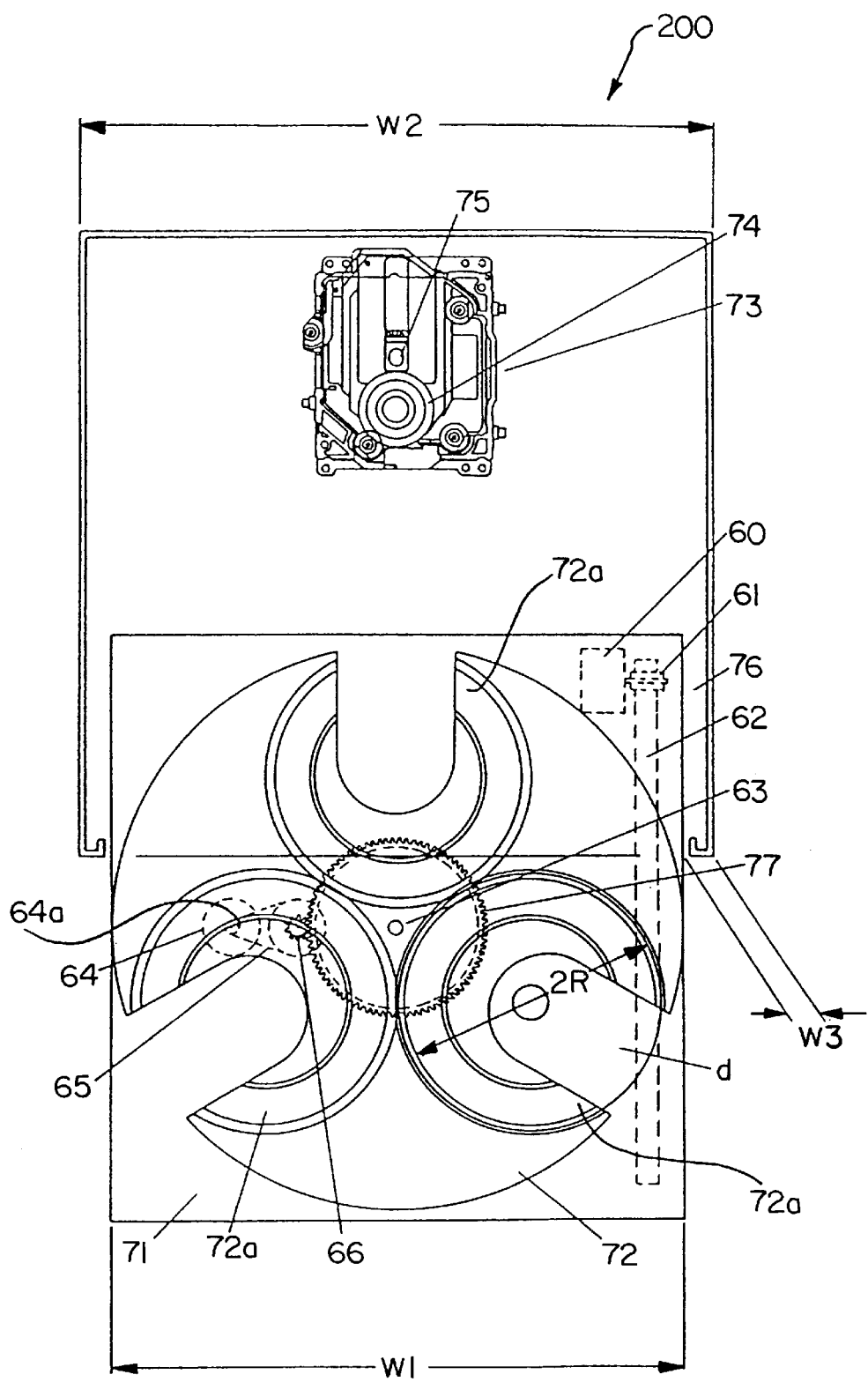
FIG. 46 is a plan view of the conventional disc changer at the disc mounting position.
Figure 47:
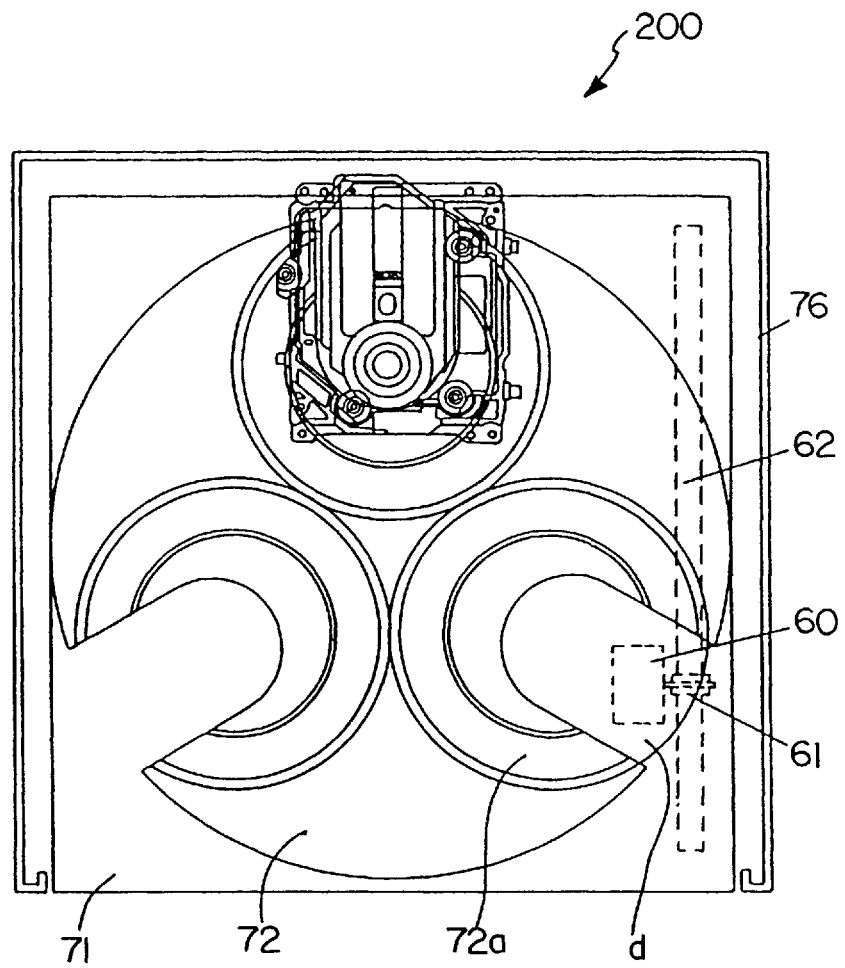
FIG. 47 is a plan view of a conventional disc changer at the playing position.
Figure 48:
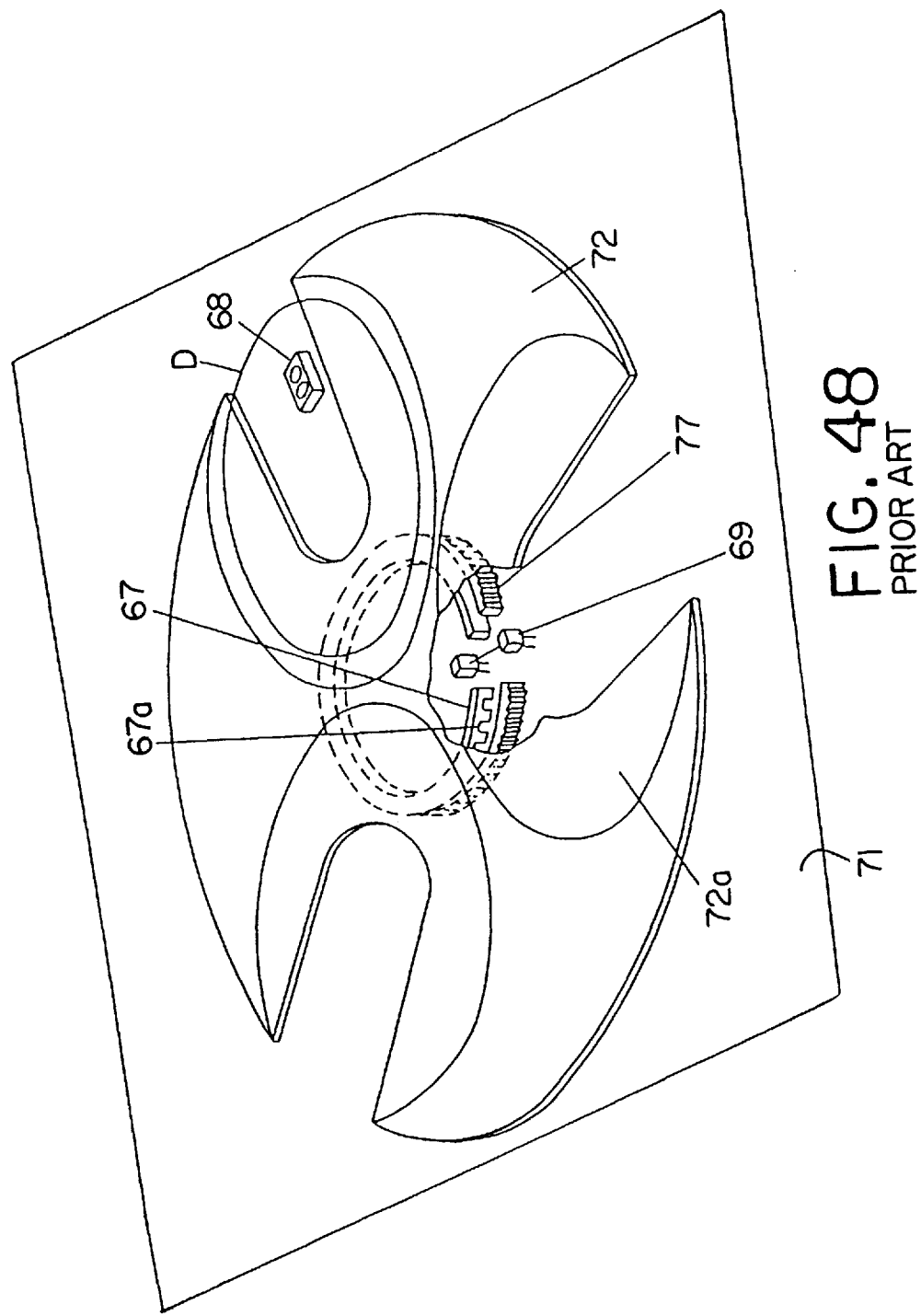
FIG. 48 is a perspective view of a tray of the conventional disc changer shown in FIGS. 46 and 47.

As is shown in FIGS. 2 and 21, a counting ring 50 is inserted by pressure into the gear 33. The counting ring 50 and the gear 33 rotate integrally. The counting ring 50 has a slit 50a (FIG. 2). The counting ring 50 having the slit 50a is intended to transmit or shield light emitted and detected by a light emitting and detecting element 51 to electrically output a signal representing the rotation speed of the motor 30. A switch assembly 52 is provided on a bottom surface of the driving gear 45. As is shown in FIG. 43, the switch assembly 52 includes switches 52a and 52b. The switch 52a detects that the disc player 3 is elevated or in the playing state is raised when the tray table 17 is closest to the disc player 3 (FIG. 32), and the switch 52b detects the rotation position of the driving gear 45 corresponding to the state where the disc player 3 is lowered or in the non-playing state (FIG. 35). A switch assembly 53 (FIG. 2), which is provided on a bottom surface of the tray table 17, includes switches 53a and 53b as is illustrated in FIG. 43. The switch 53a detects that the disc changer 100 is at the first disc mounting position (FIG. 13), and the switch 53b detects that the disc changer 100 is at the second disc mounting position (FIG. 14). Reference numeral 54 denotes a light emitting and detecting element for detecting the stopping position of the tray 2. The light emitting and detecting element 54 is fixed to the mechanism support 20 to face the reflection plate 10 provided on the bottom surface of the tray 2 when the tray table 1 is at the playing position.

The light emitting and detecting element 54 located at such position that the light emitted from the light emitting and detecting element 54 is reflected also by the disc located on one of the disc carrying areas when the tray support is at the playing position.

FIG. 43 is a circuit diagram of the disc changer 100 showing the relationship of a control circuit 55 with input and output devices. The input devices include the light emitting and detecting elements 51 and 54, and the switches 51a, 51b, 53a and 53b. The output devices include the motor 30 and the electromagnet 39. The control circuit 55 is connected with an input device 56 for an operator, such as an operational button.

FIG. 44 is a graph illustrating electrical outputs from the light emitting and detecting elements 51 and 54. The output from the light emitting and detecting element 54 corresponds to the output along the phantom line in FIG. 3. More particularly, the light emitting and detecting element 54 outputs different signals according to the positions of the three discs when no disc is being played and the positions of the three discs after rotation at 60 degrees of the tray 2 (F). The light emitting and detecting element 51 outputs predetermined pulses while moving. By counting such pulses, the rotation of the motor 30 can be controlled so that the three discs can stop at a predetermined position and also can be decelerated immediately before reaching the stopping position thus to stop securely.

FIG. 45 shows a front panel 27 of the housing 26. The front panel 27 includes an opening 27a through which the tray 2 enters and goes out of the housing 26. The housing 26 has projections 27b at the opening 27. The projections 27b contact projections of the tray 2 in order to prevent a different disc from being mounted on the disc carrying area 2a corresponding to the disc which is being played.

The disc changer 100 having the above-described structure operates in the following manner:

The disc changer 100 is in the state illustrated in FIG. 19 while the disc player 3 is playing the disc. Practically, the disc player 3 is raised, and the tray support 1 and the tray 2 are accommodated in the housing 26 as is illustrated in FIG. 12. The cam gear 36 is locked with the lock lever 37 as is shown in FIGS. 24 and 27. Although the driving gear 45 is connected with the motor 30 through the gears as is shown in FIG. 30, the driving gear 45 stops since the motor is in the "OFF"-state.

In order to exchange discs while one of the discs is being played, the motor 30 is turned "ON" by closing a switch through the control circuit 55. Then, the driving gear 45 rotates counterclockwise (arrow C) from the state in FIG. 32 to the state in FIG. 34, thereby rotating the gear 44 counterclockwise to move the tray support 1 toward the mechanism support 20 (arrow B) to the first disc mounting position shown in FIG. 13. In this state, the two disc carrying areas 2a which do not have the disc being played can receive a disc. The tray support 1 can be moved back to the state in FIG. 12 by rotating the motor 30 oppositely from above by closing a switch. When the disc changer 100 is commanded to go into the non-playing state by closing a switch, the driving gear 45 rotates clockwise from the state shown in FIGS. 19 and 32 to the state shown in FIGS. 20 and 35. Thus, the disc player 3 is lowered. Only when the disc player 3 is at the lowered, namely, non-playing state, the tray 2 can rotate.

Then, the electromagnet 39 is turned ON to engage the gear 41 and the connection gear 12 (FIG. 31). When the cam gear 36 is locked as is shown in FIG. 29, the tray 2 rotates by a minimum distance to put the desired disc in the playing state. When the desired disc is selected by the detection system illustrated in FIG. 44, the electromagnet 39 is again turned ON to engage the gear 41 and the driving gear 45 (FIG. 30). The gear 41 rotates clockwise, and thus driving gear 45 rotates counterclockwise. Accordingly, the plate 24 moves from the state in FIG. 35 to the state in FIG. 32, thereby putting the disc player 3 to the playing state.

In order to exchange discs when no disc is being played, the electromagnet 39 is turned ON to engage the gear 41 and the connection gear 12. Then, the tray 2 rotates at 60 degrees from the playing position. The electromagnet 39 is again turned ON to engage the gear 41 and the driving gear 45. The driving gear 45 rotates clockwise to rotate the gear 44 counterclockwise (FIGS. 36 and 37) to move the tray support 1 toward the mechanism support 20 (FIG. 14). In this state, all the three disc receiving areas 2a can receive a disc. Accordingly, it is not necessary to rotate the tray 2 after the tray 2 is pulled out, and thus the tray 2 is locked by the lock lever 13.

In the state where the tray 2 is rotated 60 degrees, an outer wall 1a of the tray support 1 protects the disc from slipping down, and further disc location identifying numbers can be provided on the tray support 1 so that the numbers can be seen through an opening of each disc carrying area 2a as is shown in FIG. 14. The tray support 1 can be put back into the playing position in FIG. 12 by rotating the motor 30 oppositely from the above-described manner by closing a switch.

According to the present invention, the outer profile of the tray 2 is generally polygonal. Due to such a shape, the width W4 of the tray 2 is 244 mm, which is shorter than the effective diameter of the tray (263 mm). Thus, the width W5 of the housing 26 can be 270 mm. As a result, the disc changer 100 can be compact and can have a uniform size with the other apparatuses in an audio system.

As is shown in FIGS. 12 through 14, for exchanging discs while a disc is being played, the tray support 1 is moved only by distance M to pull the two disc carrying areas 2a which do not carry a disc being played outside the housing 26. For exchanging discs while no disc is being played, the tray support 1 is rotated at 60 degrees and moved by distance N in a sequence of operations to pull all the three disc carrying areas 2a outside the housing 26. In this manner, one or more, even all the discs can be replaced only by moving the tray support 1 without rotating the tray 2 after the tray 2 is pulled out.

The housing 26 has projections 27b at the front opening 27a. The projections 27b contact the projections of the tray 2 to prohibit a different disc from being mounted on the disc carrying area 2a having a disc which is being played through the front opening 27a.

The gear 41 and the connection gear 12 are in engagement with one another only when the tray support 1 is at the playing position. The reflection plates 10 are provided at positions corresponding to the stopping positions of the tray 2. The light emitting and detecting element 54 is provided at such positions as to receive the light reflected by the reflection plates 10 only when the tray support 1 is at the playing position. Due to such a structure, electric parts and components such as motors or devices for detecting the disc or rotation positions can be eliminated from the tray support 1. The wire connection is only required to the electric circuit in the mechanism support 20. Accordingly, the number of the parts and components and thus the size of the disc charger can be reduced.

Further, since the light emitting and detecting element 54 is located at such position that the light emitted from the light emitting and detecting element 54 is reflected by the disc located on one of the disc carrying areas when the tray support is at the playing position, the rotation position of the tray 2 and the existence of the disc can both be detected by one light emitting and detecting element 54.

For horizontally moving the tray support 1, a clutch mechanism including the cam gear 36 and the lever 35 engages the gear 41 and the driving gear 45. Only when the tray support 1 is at the playing position, the gear 41 engages the gear 6 on the bottom surface of the tray 2 through the connection gear 12. Accordingly, the horizontal movement of the tray support 1 and the rotation of the tray 2 are both driven by only one motor and deceleration mechanism. As a result, the number of the parts and components and thus the size of the disc charger can be reduced.

For moving the tray 2 from the playing position to the second disc mounting position, the tray 2 is rotated at 60 degrees before being moved out of the housing 26. Accordingly, the wall 1a of the tray support 1 protects the disc from slipping down by movement or slight vibration.

Further, the moving distance of the tray 2 is shorter than when the tray 2 is moved out without rotation. Accordingly, the vibration is smaller and the tray 2 is able to withstand a larger force than in the conventional disc changers.

By providing the disc numbers on the tray support 1 so that the disc numbers can be seen through the opening of the disc carrying areas 2a, the discs can be easily distinguishable.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disc changer, comprising:

a housing;

a disc player in the housing having an engaged playing and a disengaged non-playing state;

a tray support horizontally movable between an extended disc mounting position and a fixed playing position in the housing;

a rotation shaft on the tray support;

a tray rotatable around the rotation shaft so as to have a fixed axis of rotation relative to the tray support, the tray having a plurality of disc carrying areas each for carrying a disc for presentation to the disc player, the disc carrying areas being equally angularly spaced, the tray having a generally polygonal profile and the tray support having a width which is shorter than the effective diameter of the tray;

a motor within the housing for use in rotating the tray, extending the tray support, and engaging and disengaging the disc player;

a gear transmission driven by the motor operative alternately to engage and disengage the disc player, extend the tray support, or rotate the tray; and a solenoid operative when energized to shift the gear transmission to rotate the tray.

2. The disc changer according to claim 1, wherein the width of the tray support is approximately equal to four times a disc radius.

3. A disc changer according to claim 1, wherein the solenoid when next energized is operative to shift the gear transmission to engage the disc player.

4. A disc changer according to claim 3, wherein the solenoid when energized is operative to release a cam gear.

5. A disc changer according to claim 1, wherein the solenoid is operative to shift the gear transmission when the disc player is disengaged to rotate the tray.

6. A disc changer according to claim 1, wherein the solenoid is operative when successively energized when the disc player is disengaged to shift the gear transmission to rotate the tray, and then extend the tray support.

7. A disc changer according to claim 6, wherein the solenoid when energized is operative to release a cam gear.

8. A disc changer according to claim 1, wherein the gear transmission is operative to ensure that the tray is oriented in one of a plurality of predefined positions about its axis of rotation to enable the tray to be extended by the tray support out through a slot in the housing, the slot having a width which is less than the effective diameter of the tray.

* * * * *